United States Patent
Sato et al.

(10) Patent No.: US 7,408,683 B2
(45) Date of Patent: Aug. 5, 2008

(54) IMAGE SENSOR FOR READING IMAGE AND IMAGE READING APPARATUS INCLUDING THE IMAGE SENSOR

(75) Inventors: Tatsuya Sato, Ichinomiya (JP); Tetsuya Kato, Chiryuu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1100 days.

(21) Appl. No.: 10/617,810

(22) Filed: Jul. 14, 2003

(65) Prior Publication Data

US 2004/0032628 A1 Feb. 19, 2004

(30) Foreign Application Priority Data

Jul. 15, 2002 (JP) .............................. 2002-205455
Jul. 19, 2002 (JP) .............................. 2002-210600

(51) Int. Cl.
*H04N 1/04* (2006.01)
(52) U.S. Cl. ..................... 358/474; 358/514; 358/482; 358/425; 358/505; 382/323; 382/312; 348/308; 348/306; 348/250; 348/E3.021; 348/302
(58) Field of Classification Search ................ 358/474, 358/518, 505, 425, 445, 1.2, 1.9, 482, 483, 358/513, 449, 463, 514; 382/323, 312; 348/302, 348/272, 300, 308, 211.5, 211.4, 230, 240.3; 356/478
See application file for complete search history.

(56) References Cited

U.S. PATENT DOCUMENTS 5,363,216 A 11/1994 Kim
5,483,359 A * 1/1996 Yumiba et al. .............. 358/513
5,594,501 A * 1/1997 Suzuki ........................ 348/362
5,867,045 A 2/1999 Ueno et al.
6,032,864 A 3/2000 Hamasuna
6,054,703 A 4/2000 Liu
6,249,618 B1 6/2001 Hou
6,539,129 B1 * 3/2003 Yushiya ...................... 382/323
6,747,745 B2 * 6/2004 Ishikawa et al. ............ 356/614
7,164,115 B2 * 1/2007 Yagi .......................... 250/214.1
2004/0032628 A1 2/2004 Sato et al.

FOREIGN PATENT DOCUMENTS

| CN | 12580040 A | 6/2000 |
| CN | 2655555 Y | 11/2004 |
| JP | A 02-071560 | 3/1990 |
| JP | A 06-078113 | 3/1994 |
| JP | A 06-268920 | 9/1994 |
| JP | A 06-303378 | 10/1994 |
| JP | A 08-237424 | 9/1996 |

(Continued)

*Primary Examiner*—Negussie Worku
(74) *Attorney, Agent, or Firm*—Oliff & Berridge, PLC

(57) ABSTRACT

An image sensor including a plurality of photoelectric conversion elements arranged in a main scanning direction, a plurality of switching elements connected to respective ones of the photoelectric conversion elements, individually, and a controller for generating a clock signal to control the switching elements. The photoelectric conversion elements are divided into plural groups, each including a predetermined number (N) of the photoelectric conversion elements. The outputs from the photoelectric conversion elements in one group are read out simultaneously in response to the clock signal generated from the controller, thereby attaining a high speed reading of a document.

10 Claims, 17 Drawing Sheets

FOREIGN PATENT DOCUMENTS

| | | |
|---|---|---|
| JP | A 10-224616 | 8/1998 |
| JP | A 10-285330 | 10/1998 |
| JP | A 10-285332 | 10/1998 |
| JP | A 11-313192 | 11/1999 |
| JP | A 2000-196807 | 7/2000 |
| JP | A 2000-299764 | 10/2000 |
| JP | A 2001-245212 | 9/2001 |
| JP | A 2002-185698 | 6/2002 |

* cited by examiner

IMAGE SENSOR FOR READING IMAGE AND IMAGE READING APPARATUS INCLUDING THE IMAGE SENSOR

BACKGROUND OF THE INVENTION

1. Field of the Invention

The present invention relates to an image sensor. More specifically, the present invention relates to a MOS type image sensor that is used as a contact type image sensor (CIS) for reading an image such as a document, and an image reading apparatus such as a facsimile machine utilizing the image sensor.

2. Description of the Related Art

Conventionally, two types of image sensors are used with an image reading apparatus such as a facsimile machine; a CCD type image sensor and a MOS type image sensor. Of those, a MOS type linear image sensor is often used as a contact type image sensor FIG. 17 shows a conventional MOS type linear image sensor 100. This image sensor 100 includes a plurality of photoelectric conversion elements (phototransistors or photodiodes) 101 that convert light reflected by the surface of a document into an electric signal as an analog image signal, a plurality of switching elements (analog switches) 102 for reading out the analog image signal from the photoelectric conversion element 101, and a control unit (a shift register) 103 for controlling time-sequentially the switching elements 102. These elements 101, 102 and 103 are integrated into a single chip LSI.

However, the above-mentioned conventional image sensor, in which a lot of photoelectric conversion elements are arranged in a main scanning direction, has following problems to satisfy requirements for high resolution and for high speed reading.

Firstly, analog switches that are capable of high speed switching operation are required as the switching elements 102. In addition, an analog amplifier 104 that can amplify the read image signals from the photoelectric conversion elements at high speed is required.

Secondly, a shift register that includes as many flip-flop circuits as the switching element 102 is necessary as the control unit 103. Accordingly, a large area for arranging the flip-flop circuits is necessary, so that the chip size becomes large.

Thirdly, as a frequency of driving clock increases, it is difficult to eliminate high frequency components of the clock signal. As a result, a problem of electromagnetic interference (EMI) noise occurs.

Fourthly, the following case will be supposed in which an image sensor having a lot of photoelectric conversion elements arranged in the main scanning direction is required in order to read a high resolution image. If a reading condition is changed so as to satisfy low resolution reading requirement, it is required to thin-out the image signals or to average the levels of the image signals in order to convert the resolution after reading at high resolution. Therefore, in spite of low resolution reading, time period to read the image is long. Thus, it is difficult to support a request for placing a higher priority on reading speed than resolution.

SUMMARY OF THE INVENTION

An object of the present invention is to provide an image sensor that is capable of reading at high speed without increasing the frequency of the clock signal.

Another object of the present invention is to provide an image sensor in which switching elements or an analog amplifier is not forced to work at high speed.

Still another object of the present invention is to provide an image reading apparatus that has a compact size by decreasing the number of the flip-flop circuits and downsizing the area occupied by the shift register.

Still another object of the present invention is to provide an image reading apparatus that suppresses EMI noise Still another object of the present invention is to provide an image reading apparatus that can read a document with low resolution and at high speed, if necessary.

The present invention provides an image sensor including a plurality of photoelectric conversion elements arranged in a main scanning direction. Each of the plurality of photoelectric conversion elements generates an analog image signal corresponding to an amount of incident light thereon. The photoelectric conversion elements are divided into plural groups, each of the plural groups including a predetermined number (N) of the photoelectric conversion elements. More than one switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups.

The present invention provides an image reading apparatus including an image sensor. The image sensor includes a plurality of photoelectric conversion elements arranged in a main scanning direction. Each of the plurality of photoelectric conversion elements generates an analog image signal corresponding to an amount of incident light thereon. The photoelectric conversion elements are divided into plural groups. Each of the plural groups includes a predetermined number (N) of the photoelectric conversion elements. More than one switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups. Signal output lines are provided with a number equal to N. The predetermined number of photoelectric conversion elements in each of the plural groups are connectable with the respective ones of the signal output lines through the switching elements, individually, to output the image signals from the predetermined number of photoelectric conversion elements to the signal output lines. The image reading apparatus further includes a multiplexer connected to the signal output lines of the image sensor for multiplexing the image signals transferred through the signal output lines; and an analog-to-digital converter for converting the image signal that is multiplexed by the multiplexer into a digital signal.

The present invention provides an image reading apparatus including an image sensor. The image sensor includes a plurality of photoelectric conversion elements arranged in a main scanning direction. Each of the plurality of photoelectric conversion elements generates an analog image signal corresponding to an amount of incident light thereon. The photoelectric conversion elements are divided into plural groups, each of the plural groups including a predetermined number (N) of the photoelectric conversion elements. More than one switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups. Signal output lines are provided with a number equal to N. The predetermined number of photoelectric conversion elements in each of the plural groups are connectable with the respective ones of the signal output lines through the switching elements, individually, to output the image signals from the predetermined number of photoelectric conversion elements to the signal output lines. The image reading apparatus further includes a plurality of analog-to-digital converters connected to the respective ones of the signal output lines, individually, for converting the image signals transferred through the signal output lines into digital signals.

The present invention provides an image reading apparatus including an image sensor. The image sensor includes a plurality of photoelectric conversion elements arranged in a main scanning direction. Each of the plurality of photoelectric conversion elements generates an analog image signal corresponding to an amount of incident light thereon. The photoelectric conversion elements are divided into plural groups. Each of the plural groups includes a predetermined number (N) of the photoelectric conversion elements. More than one switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups. Signal output lines are provided with a number equal to N. The predetermined number of photoelectric conversion elements in each of the plural groups are connectable with the respective ones of the signal output lines through the switching elements, individually, to output the image signals from the predetermined number of photoelectric conversion elements to the signal output lines. The image reading apparatus further includes a sample-and-hold circuit connected to the signal output lines of the image sensor for temporarily storing the image signal transferred from one of the photoelectric conversion elements though the corresponding ones of the switching elements and the signal output lines, a multiplexer for multiplexing the image signal stored temporarily in the sample-and-hold circuit, and an analog-to-digital converter for converting the image signal that is multiplexed by the multiplexer into a digital signal.

The present invention provides an image reading apparatus including an image sensor. The image sensor includes a plurality of photoelectric conversion elements arranged in a main scanning direction. Each of the plurality of photoelectric conversion elements generates an analog image signal corresponding to an amount of incident light thereon. The photoelectric conversion elements are divided into plural groups, each of the plural groups including a predetermined number (N) of the photoelectric conversion elements. A plurality of switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups. Signal output lines are provides with a number equal to N. The predetermined number of photoelectric conversion elements in each of the plural groups are connectable with the respective ones of the signal output lines through the switching elements, individually, to output the image signals from the predetermined number of photoelectric conversion elements to the signal output lines. The image reading apparatus further includes a multiplexer connected to the image sensor for multiplexing the image signal transferred from one of the photoelectric conversion elements through the corresponding one of the output signal lines, and a sample-and-hold circuit connected to the image sensor for temporarily storing the image signal transferred from one of the photoelectric conversion elements though the corresponding ones of the switching elements and the signal output lines. The multiplexer is configured to connect with the image sensor so that one output signal line connects the image sensor to the multiplexer directly and the other output signal lines connect the image sensor to the multiplexer through the sample-and-hold circuit.

The present invention provides an image reading apparatus including an image sensor. The image sensor includes a plurality of photoelectric conversion elements arranged in a main scanning direction. Each of the plurality of photoelectric conversion elements generates an analog image signal corresponding to an amount of incident light thereon. The photoelectric conversion elements are divided into plural groups, each of the plural groups including a predetermined number (N) of the photoelectric conversion elements. A plurality of switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups. Signal output lines are provided with a number equal to N. The predetermined number of photoelectric conversion elements in each of the plural groups are connectable with the respective ones of the signal output lines through the switching elements, individually, to output the image signals from the predetermined number of photoelectric conversion elements to the signal output lines, The image reading apparatus further includes an analog front-end IC including; an analog amplifier for amplifying an analog input signal received through one of a plurality of channels; a multiplexer for multiplexing the analog input signal amplified by the analog amplifier; and an analog-to-digital converter for converting the analog input signal of each channel that is multiplexed by the multiplexer into a digital signal. The signal output lines function as the plurality of channels of the analog front-end IC. The analog front-end IC is connected to the image sensor so that the analog front-end IC receives the image signal transferred from each of the photoelectric conversion elements through the corresponding one of the signal output lines as the analog input signal.

The present invention provides an image reading apparatus including an image sensor. The image sensor includes a plurality of photoelectric conversion elements arranged in a main scanning direction. Each of the plurality of photoelectric conversion elements generates an analog image signal corresponding to an amount of incident light thereon. The photoelectric conversion elements are divided into plural groups. Each of the plural groups includes a predetermined number (N) of the photoelectric conversion elements. A plurality of switching elements are connected to respective ones of the plurality of photoelectric conversion elements, individually. A control unit controls the plurality of switching elements in response to an external clock signal to simultaneously output the image signals from the predetermined number of photoelectric conversion elements in one of the plural groups. The predetermined number of photoelectric conversion elements in each of the plural groups are connectable with the respective ones of the signal output lines through the switching elements, individually, to output the image signals from the predetermined number of photoelectric conversion elements to the signal output lines. The image reading apparatus further includes a multiplexer having signal input terminals with a number equal to N, and a signal output terminal, the multiplexer being connected to the image sensor so that the multiplexer receives the image signals from the plural photoelectric conversion elements that belong to one of the groups through the signal input terminals in parallel and simultaneously. An analog-to-digital converter is connected to the signal output terminal of the multiplexer for converting the analog image signal supplied sequentially from the multiplexer into a digital signal. Resolution switching unit selects one of a high resolution mode in which all the image signals from the photoelectric conversion elements that belong to each of the groups are supplied sequentially to the analog-to-digital converter and a low resolution mode in which the image signals are thinned out and then supplied to the analog-to-digital converter.

BRIEF DESCRIPTION OF THE DRAWINGS

The aforementioned aspects and other features of the invention are explained in the following description, taken in connection with the accompanying drawing figures wherein.

DESCRIPTION OF THE PREFERRED EMBODIMENTS

Hereinafter, preferred embodiments according to the present invention will be described in detail with reference to the drawings.

Figure 1:
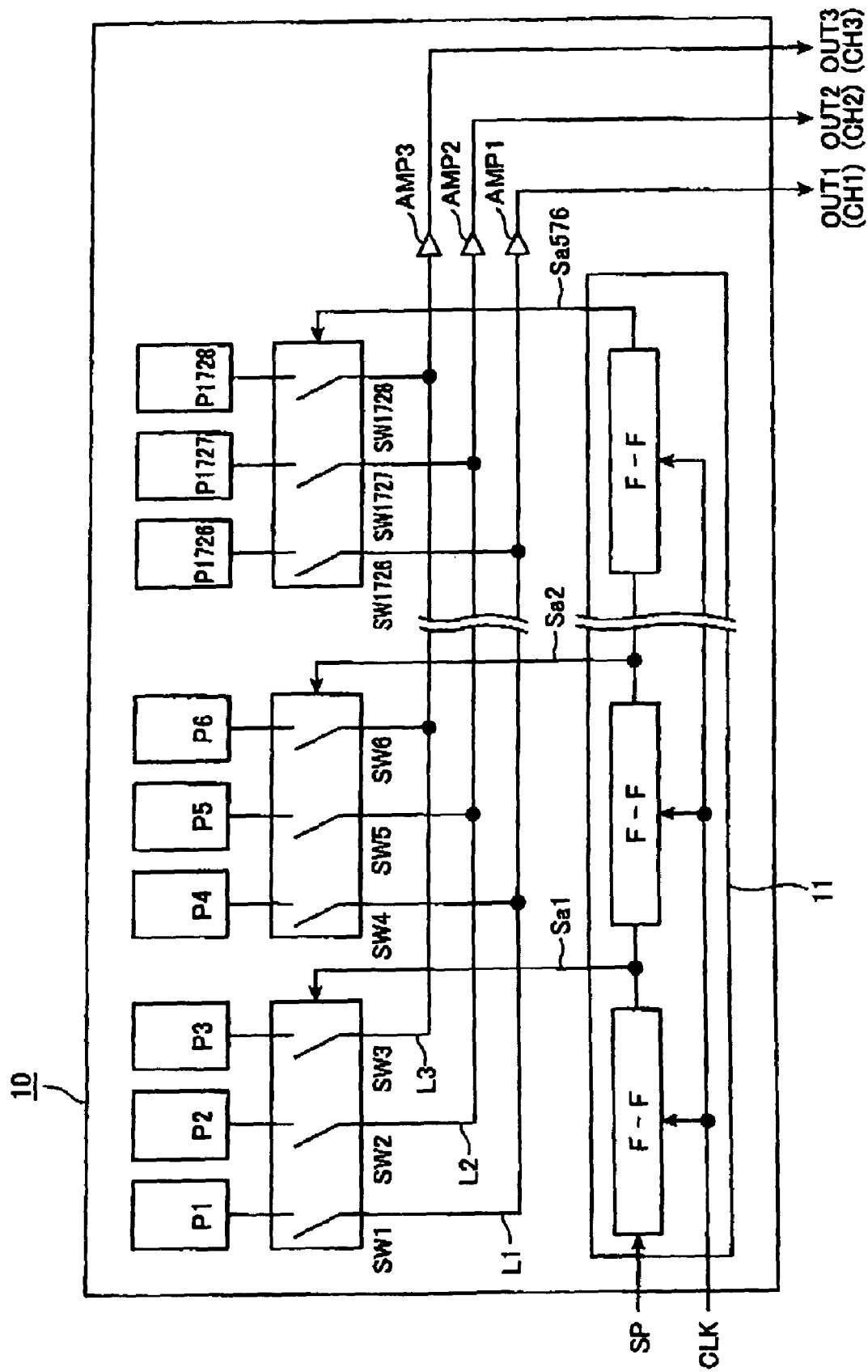
FIG. 1 is a circuit diagram showing an image sensor showing a first embodiment of the present invention.

FIG. 1 shows a MOS type linear image sensor 10 according to a first embodiment. The image sensor 10 is a contact type image sensor (CIS) that is used for a document reading apparatus such as a facsimile machine.

As shown in FIG. 1, the image sensor (CIS) 10 includes a plurality of phototransistors P1-Pn and a plurality of analog switches SW1-SWn, each of which is connected to the respective ones of the phototransistors P1-Pn, individually. Each of the phototransistors P1-Pn generates an analog image signal having a level corresponding to an amount of incident light thereon which is reflected by a document to be scanned.

The plural phototransistors P1-Pn are arranged on a line extending in a main scanning direction at predetermined intervals to constitute a so-called linear image sensor. It should be noted that the predetermined interval may be changed depending on the finest resolution of the image sensor.

The plural phototransistors P1-Pn are divided into plural groups, each of which includes a predetermined number (N) of neighboring phototransistors. When plural image signals from the predetermined number (N) of the phototransistors are read out simultaneously, the analog switches that are connected to the corresponding one of the phototransistors are turned on simultaneously.

Namely, when the image sensor has 1728 phototransistors arranged in the main scanning direction, the phototransistors are divided into 576 groups each of which includes three (N=3) neighboring phototransistors. Three analog switches (SW1-SW3, SW4-SW6, . . . , or SW1726-SW1728) in one group are configured to be turned on simultaneously, so that image signals of three phototransistors (P1-P3, P4-P6, . . . , or P1726-P1728) belonging to each group can be read out simultaneously.

A shift register 11 includes a plurality of flip-flop circuits in the same way as that of the conventional apparatus so as to control the analog switches SW1-SWn time-sequentially in response to an external clock signal. In this embodiment, the shift register 11 includes 576 flip-flop circuits, and the number 576 is the same as the total number of the groups of switches.

The total 576 output terminals of flip-flop circuits constituting the shift register 11 are connected to the groups of switches, respectively. Therefore, three analog switches (SW1-SW3, SW4-SW6, . . . , or SW1726-SW1728) in one group of switch are turned on simultaneously every time an output of the flip-flop circuits is issued to the corresponding one of the switches.

Thus, the shift register 11 responds to the clock signal CLK that is given externally after a start pulse SP is supplied, and control signals Sa1, Sa2, . . . are supplied sequentially from the output terminals of the flip-flop circuits to the corresponding switch group. For example, when the control signal Sa1 is issued, three analog switches (SW1-SW3) belonging to the first group are turned on simultaneously. Next, when the control signal Sa2 is issued, three analog switches (SW4-SW6) belonging to the second group are turned on simultaneously. Then, three analog switches belonging to the next group such as the third group, the forth group, etc. are turned on at the same time. Finally, when the control signal Sa576 is delivered, three analog switches (SW1726-SW1728) belonging to the 576-th group are turned on at the same time.

Furthermore, the image sensor 10 of this embodiment includes three signal output lines L1-L3. The number of signal output lines is the same as the number of the phototransistors P (analog switches SW) that belong to one group of switch. The plural analog switches SW that are connected to plural phototransistors P belonging to one group of switch are connected to different signal output lines L1-L3 so that the image signals from the plural (three) phototransistors P belonging to one group are supplied in parallel to each of the signal output lines L1-L3. For example, the first analog switch (SW1, SW4, . . . , or SW1726) of each group is connected to the first signal output line L1. The second analog switch (SW2, SW5, . . . , or SW1727) of each group is connected to the second signal output line L2. The third analog switch (SW3, SW6, . . . , or SW1728) of each group is connected to the third signal output line L3.

In addition, the plural (three) signal output lines L1-L3 are respectively provided with analog amplifiers AMP1-AMP3 for amplifying the image signals from the phototransistors P1-Pn, which are read out through the analog switches SW1-SWn. The read signals as three channel output signals CH1-CH3 are extracted externally from the image sensor through the three output terminals OUT1-OUT3 that are disposed corresponding to the signal output lines L1-L3.

Figure 2:
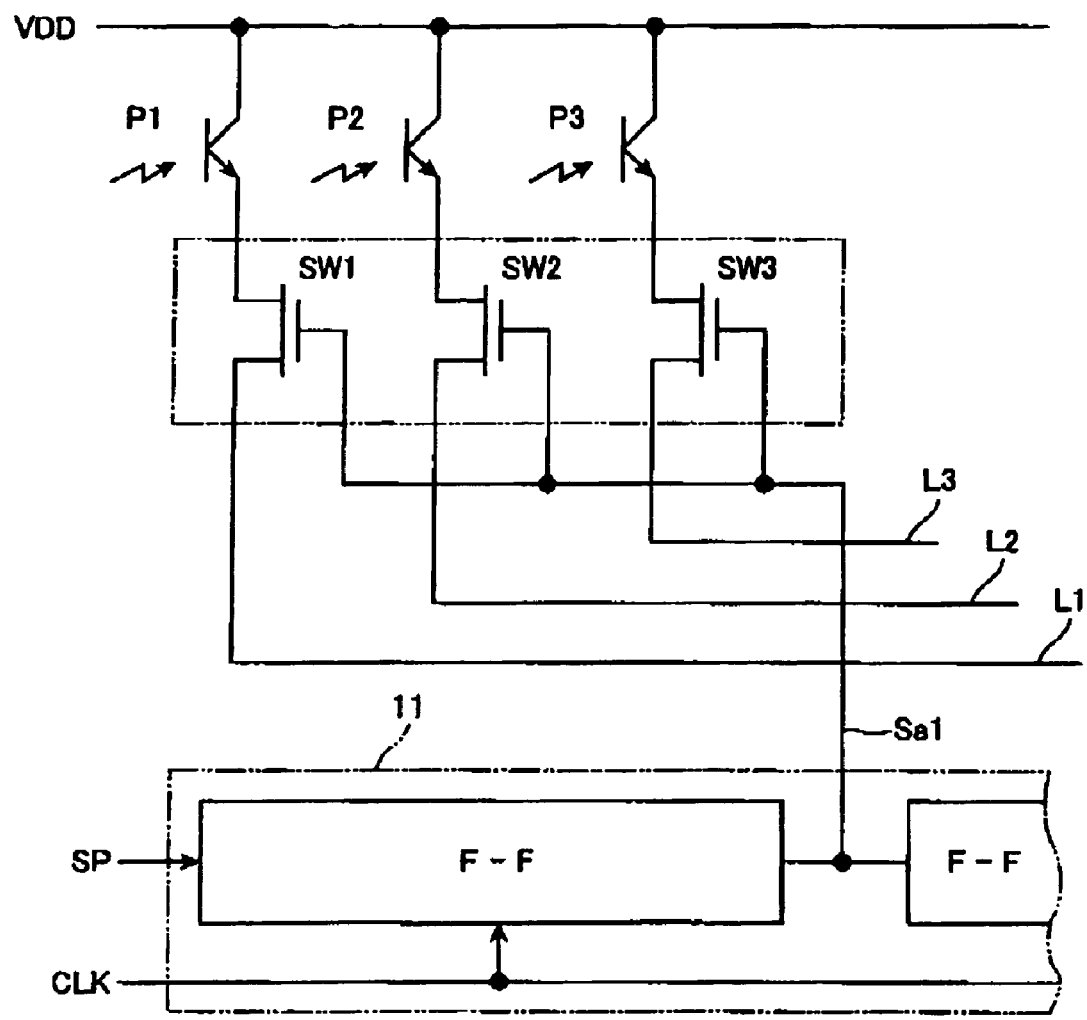
FIG. 2 is a diagram showing a part of the circuit structure of the image sensor in detail.

FIG. 2 shows a detailed structure of the phototransistor P and the analog switch SW of this embodiment. The image sensor 10 includes phototransistors P1-Pn of 1728 in total and analog switches SW1-SWn, a shift register 11 consisting of 576 flip-flop circuits, and 3 analog amplifiers AMP1-AMP3, all of which are formed on a single semiconductor substrate. In other words, all the phototransistors P1-Pn, the analog switches SW1-SWn, the shift register 11, and the analog amplifiers AMP1-AMP3 are integrated into a single chip LSI to produce a single image sensor 10.

Figure 3:
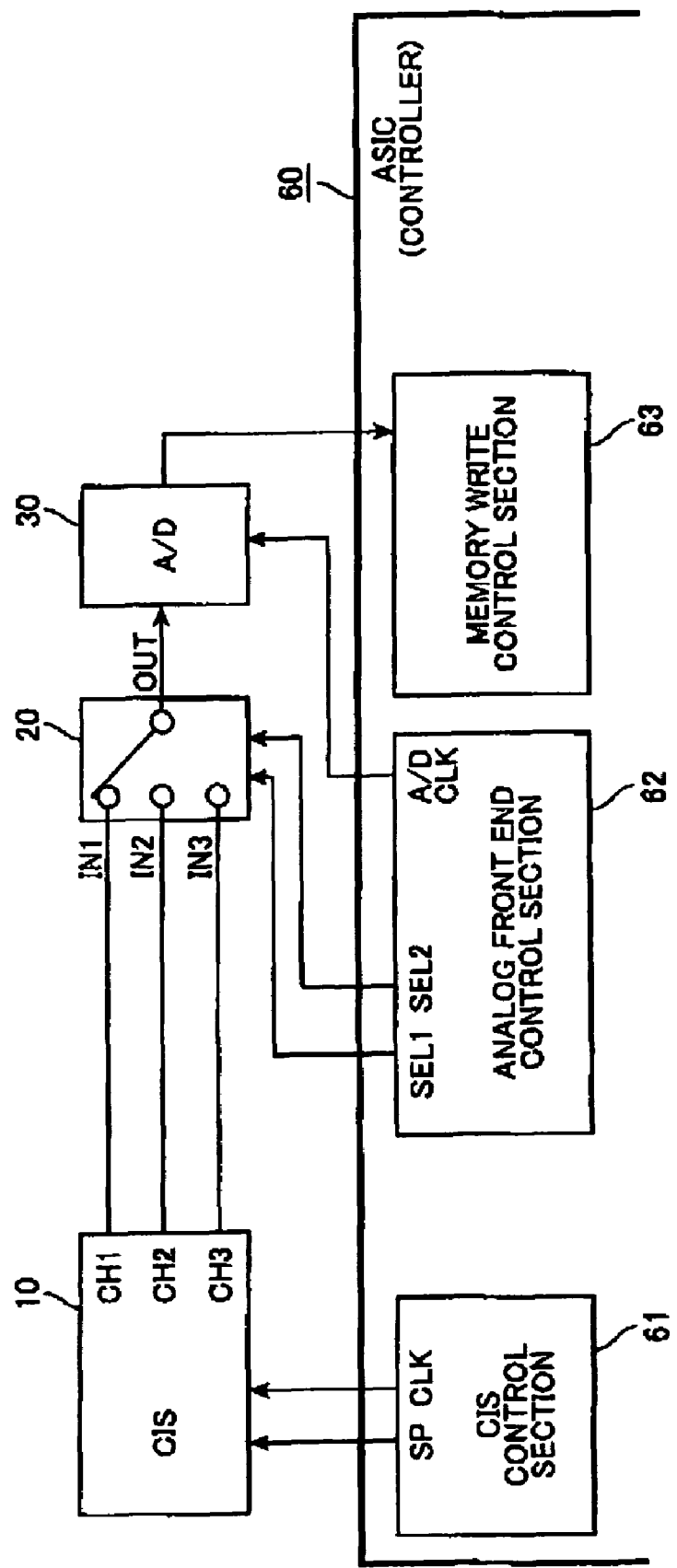
FIG. 3 is a block diagram showing an image reading apparatus utilizing the image sensor.

FIG. 3 shows an example of an image reading apparatus utilizing the image sensor 10 that has the above-mentioned structure. In the structure shown in FIG. 3, analog read signals that are transmitted through the three output terminals OUT1-OUT3 of the image sensor 10 as three channel output signals CH1-CH3 are converted into a serial data by the multiplexer 20, and supplied to an analog-to-digital converter 30 sequentially. In the analog-to-digital converter 30, each of the read signals is converted into a digital signal.

A control circuit 60 that collectively controls the image sensor 10 and the image reading apparatus is made of an application-specific integrated circuit (ASIC). In this embodiment, the control circuit 60 includes a CIS control section 61, an analog front-end control section 62, and a memory control section 63.

The CIS control section 61 is provided for supplying a start pulse SP, a clock signal CLK to the shift register 11 of the image sensor 10 under the collective control by a CPU.

The analog front-end control section 62 is provided for supplying selecting signals SEL1 and SEL2 to the multiplexer 20 and a clock signal for the analog-to-digital conversion, i.e., a clock signal A/D-CLK for determining analog-to-digital conversion timing to the analog front-end circuit that is made of the multiplexer 20 and the analog-to-digital converter 30.

In response to the selecting signals SEL1 and SEL2 for the multiplexer, selection is made on which signal among the three channel output signals CH1-CH3 that are extracted from the image sensor 10 is to be supplied to the analog-to-digital converter 30. In addition, the analog front-end control section 62 has a function of selecting resolution of a document to be read. The resolution is selected from either a "high resolution mode" or a "low resolution mode" by an external apparatus or an operation panel. Responding to the selected resolution mode, the analog front-end control section 62 generates the selecting signals SEL1 and SEL2. If no resolution is designated, the analog front-end control section 62 is normally set to read a document with high resolution mode.

The memory control section 63 samples the digital signal that is generated in the analog-to-digital converter, 30 and then writes the sampled data in a predetermined area of an image memory (RAM) sequentially.

Figure 4:
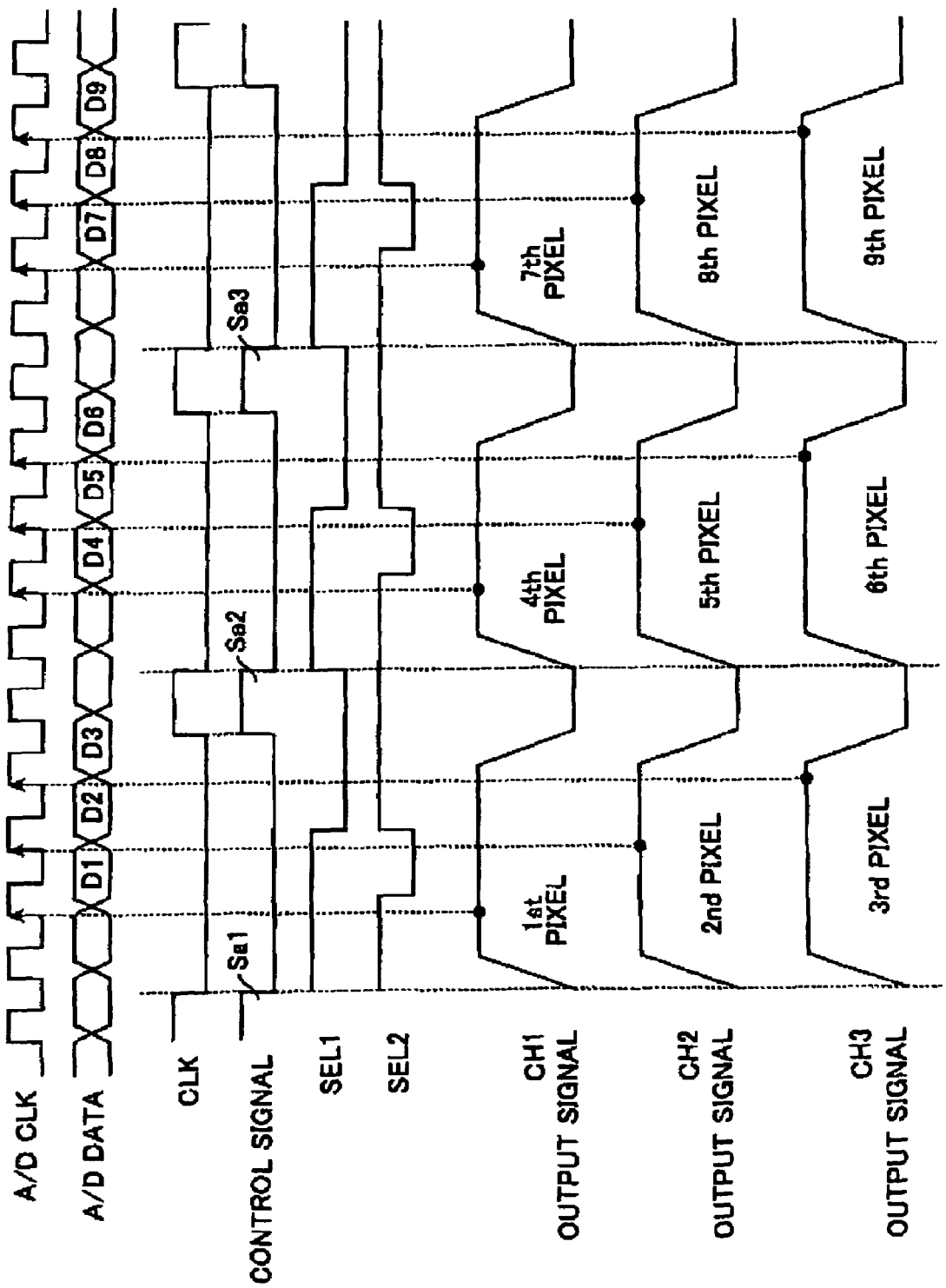
FIG. 4 is a timing chart for explaining operations of the image reading apparatus.

Furthermore, the clock signal CLK, the selecting signals SEL1 and SEL2, and the clock signal A/D-CLK for the analog-to-digital conversion are issued at timings that are shown in FIG. 4. In addition, each of the clock signal CLK, the selecting signals SEL1 and SEL2, and the clock signal A/D-CLK for the analog-to-digital conversion is generated in response to system clocks produced in the control circuit 60. It should be noted that the system clock has higher frequency than that of the clock signal CLK, the selecting signals SEL1 and SEL2, or the clock signal A/D-CLK.

Next, an operation of an image reading apparatus that utilizes the image sensor 10 having the above-mentioned structure will be described with reference to the timing chart shown in FIG. 4.

First, when the phototransistors P1-Pn receive the reflected light, charges are accumulated in the phototransistors P1-Pn in accordance with the intensity of the light reflected by the document (an object to be read).

When the control signal Sa1 is issued from the shift register 11 in response to the clock signal CLK that is supplied to the image sensor 10, three analog switches SW1-SW3 belonging to the first group are turned on at the same time so that the charges accumulated in the phototransistors P1-P3 are sent to the output signal lines L1-L3 as the analog image read signals. Next, the read image read signals are amplified by the analog amplifiers AMP1-AMP3, and then extracted as three channel output signals CH1-CH3 from the output terminals OUT1-OUT3.

After that, when the channel output signals CH1-CH3 reach a predetermined level and maintain the level for a predetermined period, signals for selecting a first channel output signal CH1, a certain combination of SEL1 and SEL2 levels (both SEL1 and SEL2 have a "High" level), are supplied to the multiplexer 20. Then, the first channel output signal CH1, i.e., a read signal from the phototransistor P1 (an image signal of a first pixel) is relayed to the analog-to-digital converter 30. Next, the first channel output signal CH1 as a digital signal D1 including a predetermined bit number of digital code is generated in the analog-to-digital converter 30 in synchronization with the clock signal A/D-CLK for the analog-to-digital conversion. Furthermore, the signal for selecting the first channel output signal CH1 is a signal that connects the first signal input terminal IN1 to the signal output terminal OUT.

After that, when signals for selecting the second channel output signal CH2, another combination of signals SEL1 and SEL2 (SEL1 has a "High" level, and SEL2 has a "Low" level) are supplied to the multiplexer 20, the second channel output signal CH2, i.e., a read signal from the phototransistor P2 (an image signal of a second pixel) is supplied to the analog-to-digital converter 30. Next, a second channel output signal CH2 as a digital signal D2 including a predetermined bit number of digital code is generated in the analog-to-digital converter 30 in synchronization with the clock signal A/D-CLK for the analog-to-digital conversion. The signal for selecting the second channel output signal CH2 is a signal that connects the second signal input terminal IN2 to the signal output terminal OUT.

After that, when signals for selecting a third channel output signal CH3, the other combination of the selecting signals SEL1 and SEL2 (SEL1 has a "Low" level, and SEL2 has a "High" level) are supplied to the multiplexer 20, the third channel output signal CH3, i.e., a read signal from the phototransistor P3 (an image signal of a third pixel) is supplied to the analog-to-digital converter 30. Next, the read signal from the phototransistor P3 as a digital signal D3 including a predetermined bit number of digital code is generated in the analog-to-digital converter 30 in synchronization with the clock signal A/D-CLK for the analog-to-digital conversion. The signal for selecting the third channel output signal CH3 is a signal that connects the third signal input terminal IN3 to the signal output terminal OUT.

Next, when the control signal Sa2 is issued from the shift register 11 in response to the clock signal CLK supplied to the image sensor 10, three analog switches SW4-SW6 that belong to the second group are turned on at the same time so that the charges accumulated in the phototransistors P4-P6 are read out as analog image signals on the output signal lines L1-L3. These read image signals are amplified by the analog amplifiers AMP1-AMP3, and then extracted as three channel output signals CH1-CH3 from the output terminals OUT1-OUT3.

After that, when the channel output signals CH1-CH3 reach the predetermined level and maintain the level for the predetermined period, the signals for selecting the first channel output signal CH1, the certain combination of the selecting signals SEL1 and SEL2 (both SEL1 and SEL2 have a "High" level) are supplied to the multiplexer 20. Then, the first channel output signal CH1, i.e., a read signal from the phototransistor P4 (an image signal of a fourth pixel) is relayed to the analog-to-digital converter 30. This read signal is converted in the analog-to-digital converter 30 into a digital signal D4 including a predetermined bit number of digital code in synchronization with the clock signal A/D-CLK for the analog-to-digital conversion. Furthermore, the signal for selecting the first channel output signal CH1 is a signal that connects the first signal input terminal IN1 to the signal output terminal OUT.

After that, when the signals for selecting the second channel output signal CH2, the second combination of the selecting signals SEL1 and SEL2 (SEL1 has a "High" level, and SEL2 has a "Low" level) are supplied to the multiplexer 20, the second channel output signal CR2, i.e., a read signal from the phototransistor P5 (an image signal of a fifth pixel) is supplied to the analog-to-digital converter 30. Next, this read signal is converted in the analog-to-digital converter 30 into a digital signal D5 including a predetermined bit number of digital code in synchronization with the clock signal A/D-CLK for the analog-to-digital conversion. The signal for selecting the second channel output signal CH2 is a signal that connects the second signal input terminal IN2 to the signal output terminal OUT.

Next, when the signals for selecting a third channel output signal CH3, the other combination of the selecting signals SEL1 and SEL2 (SEL1 has a "L" level, and SEL2 has a "H" level) are supplied to the multiplexer 20, the third channel output signal CH3, i.e., a read signal from the phototransistor P6 (an image signal of a sixth pixel) is supplied to the analog-to-digital converter 30. Next, this read signal is converted in the analog-to-digital converter 30 into a digital signal D6 including a predetermined bit number of digital code in synchronization with the clock signal A/D-CLK for the analog-to-digital conversion. The signal for selecting the third channel output signal CH3 is a signal that connects the third signal input terminal IN3 to the signal output terminal OUT.

After that, in the same way, every time when the clock signal CLK is supplied to the image sensor 10, the shift register 11 shifts the control signal Sa contained therein so that the output destination of the control signal Sa is shifted in turn. The three analog switches SW that belong to the group to which the control signal Sa is supplied are turned on simultaneously in response to the control signal Sa. Then, the image signals of three pixels are read out in parallel from the phototransistors P in the group, and extracted through the multiplexer 20 and the analog-to-digital converter 30, as a digital signal D including a predetermined bit number of digital code.

Therefore, when the digital signal D that includes a predetermined bit number of digital code and is generated sequentially in the analog-to-digital converter 30 is stored in a predetermined area of the image memory (RAM) through a memory write control section 63, the read image data can be stored in the order of the arrangement in the main scanning direction.

According to the embodiment described above, the frequency of the clock signal CLK can be decreased to ⅓, compared with that of the conventional image sensor. In addition, it is not required to use a switch that performs high speed switching operation as the analog switch SW. Furthermore, the analog amplifier AMP can be used with lower speed operation. In addition, since the number of the flip-flop circuits in the shift register 11 can be reduced to ⅓, the entire sensor can be downsized. Furthermore, since it is possible to read at high speed by the low speed clock signal CLK, generation of EMI noises can be suppressed.

It should be noted that the number (N) of the photoelectric conversion elements included in one group which are simultaneously turned on and off can be changeable. Therefore, the frequency of the clock signal CLK can be reduced depending on the number of the photoelectric conversion elements included in one group. Similarly, any switch with high speed switching operation is not required. And an analog amplifier with higher speed operation is not required.

In this way, in order to support the desire for high resolution scanning, high speed reading operation can be performed in an image sensor including a plurality of phototransistors arranged in the main scanning direction by preparing the multiplexer 20 and the analog-to-digital converter 30 that is suitable for high speed operation, for example. Furthermore, a photodiode can be used instead of the phototransistor.

Figure 5:
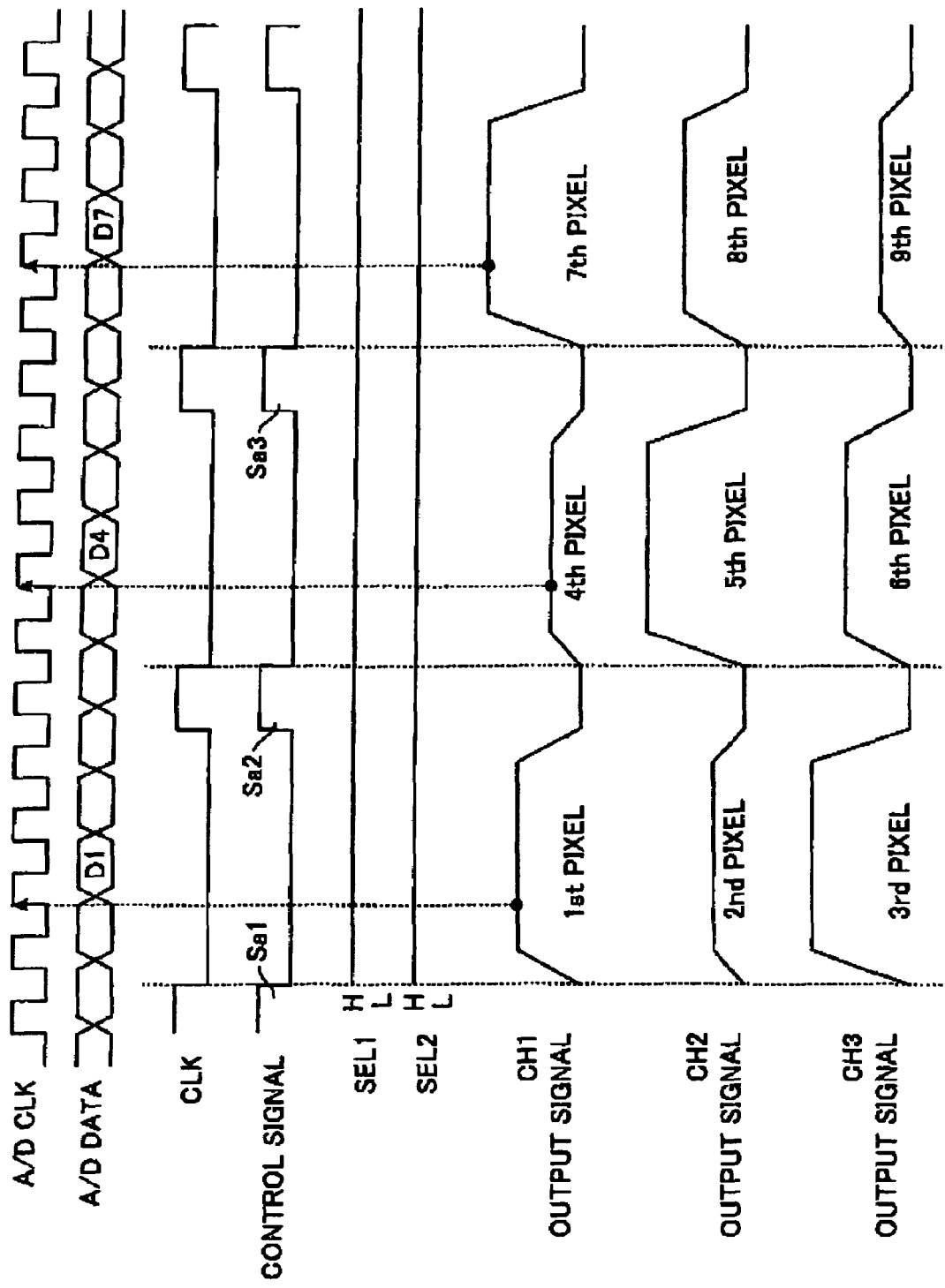
FIG. 5 is a timing chart for explaining operations of the image reading apparatus.

Next, an operation of reading a document by the image reading apparatus including the image sensor 10 described above with the different resolutions, will be described with reference to FIG. 5.

In the multiplexer 20, the selecting signals SEL1 and SEL2 supplied from the analog front-end control section 62 have a constant level without involving time sequential switching.

When a "high resolution mode" is selected in which high resolution reading is performed by converting the pixel signal (the image read signal) from the image sensor 10 into a digital signal, the analog front-end control section 62 sends a selecting signal to the multiplexer 20 for switching the first through the third signal input terminals IN1-IN3 time-sequentially. On the other hand, when a "low resolution mode" is selected in which low resolution reading is performed by an external apparatus or an operation panel, the analog front-end control section 62 sends to the multiplexer 20 the selecting signals without involving time sequential switching, i.e., selecting signals for fixedly connecting the first signal input terminal IN1 to the signal output terminal OUT (selecting signals in which both SEL1 and SEL2 are fixed to "H" level).

Therefore, in the "low resolution mode", only the first channel output signal CH1 among three channel output signals CH1-CH3 is supplied to the analog-to-digital converter 30 continuously via the multiplexer 20. Accordingly, when the control signal Sa1 is issued from the shift register 11, the read signal from the phototransistor P1 (the first pixel signal) is extracted as the digital signal as shown in FIG. 5. Next, when the control signal Sa2 is issued, a read signal from the phototransistor P4 (the fourth pixel signal) is extracted as the digital signal. After that, in the same way, every time when the control signal Sa is shifted sequentially, the seventh, the tenth, . . . , and 1726-th pixel signals are delivered as the digital signal.

Thus, in the "low resolution mode", the number of effective pixels of which read image signal is extracted is reduced to 1/3. For example, supposing that the reading resolution is "600 dpi" in the "high resolution model", reading in the "low resolution mode" is performed at "200 dpi", which is 1/3 of the reading resolution in the "high resolution mode".

In addition, only one analog-to-digital conversion operation is performed every time the control signal Sa is shifted in this "low resolution mode". Therefore, compared with the "high resolution mode" that requires three analog-to-digital conversion operations, the frequency of the clock signal CLK can be increased so that high speed reading can be performed.

Accordingly, reading in the low resolution mode is convenient for the case where it is necessary to place higher priority on reading speed than reading resolution.

Though the multiplexer 20 is not switched time-sequentially in the above-mentioned "low resolution mode", it is possible to perform the time sequential switching in accordance with a type of the resolution even when the "low resolution mode" is selected.

For example, when reading at "400 dpi" resolution is selected while reading resolution in the "high resolution mode" is "600 dpi", any two signals among the three channel output signals CH1-CH3 may be supplied to the analog-to-digital converter 30 time sequentially so that reading signal having "400 dpi" resolution can be obtained.

In this case, the analog-to-digital conversion operation is performed twice every time when the control signal Sa is shifted. Therefore, compared with the "high resolution model" that requires three analog-to-digital conversion operations, the frequency of the clock signal CLK can be increased so that high speed reading can be performed.

Furthermore, in the above-mentioned embodiment, a lot of phototransistors P arranged along the main scanning direction of the image sensor 10 are divided into plural groups each including three neighboring phototransistors, so that "600 dpi" resolution is obtained in the "high resolution model". In another embodiment, if a plurality of phototransistors P arranged along the main scanning direction are divided into plural groups each including four neighboring phototransistors by changing an interval between neighboring phototransistors, a read signal having a resolution of "600 dpi", "450 dpi", "300 dpi" or "150 dpi" can be obtained.

Namely, a multiplexer that has four signal input terminals IN1-IN4 corresponding to four channel signal outputs CH1-CH4 is provided. When all the signal input terminals IN1-IN4 of the multiplexer are switched time-sequentially to send the output signals of the photoelectric conversion elements P1-Pn to the analog-to-digital converter, a read signal having a high resolution of more than "600 dpi" can be generated. In addition, one of four signal input terminals IN1-IN4 is connected fixedly to the output terminal OUT without involving time sequential switching so that only one channel output signal is supplied to the analog-to-digital converter. Thus, a read signal having the resolution of "150 dpi" can be generated.

In addition, any two of four signal input terminals IN1-IN4 can be switched time sequentially so that any two channel output signals can be supplied sequentially to the analog-to-digital converter 30. Thus, a reading signal having "300 dpi" resolution can be delivered. Alternatively, any three of four signal input terminals IN1-IN4 can be switched time sequentially so that any three channel output signals can be supplied sequentially to the analog-to-digital converter 30. Thus, a reading signal having "450 dpi" resolution can be delivered.

In the same way, when the phototransistors P of the image sensor 10 are divided into groups each including six phototransistors by changing an interval between neighboring phototransistors P arranged in the main scanning direction, a read signal having the resolution of "600 dpi", "500 dpi", "400 dpi", "300 dpi", "200 dpi" or "100 dpi" can be obtained.

If the number of the phototransistors P that belong to one group is increased, a high speed analog-to-digital converter may be required. However, when the same number of signal output lines as that of phototransistors P in one group are divided into several groups, and an analog-to-digital converter is provided for each group of the signal output lines, high speed reading operation can b performed as a whole even if the analog-to-digital converter operates at a relatively low speed.

Figure 6:
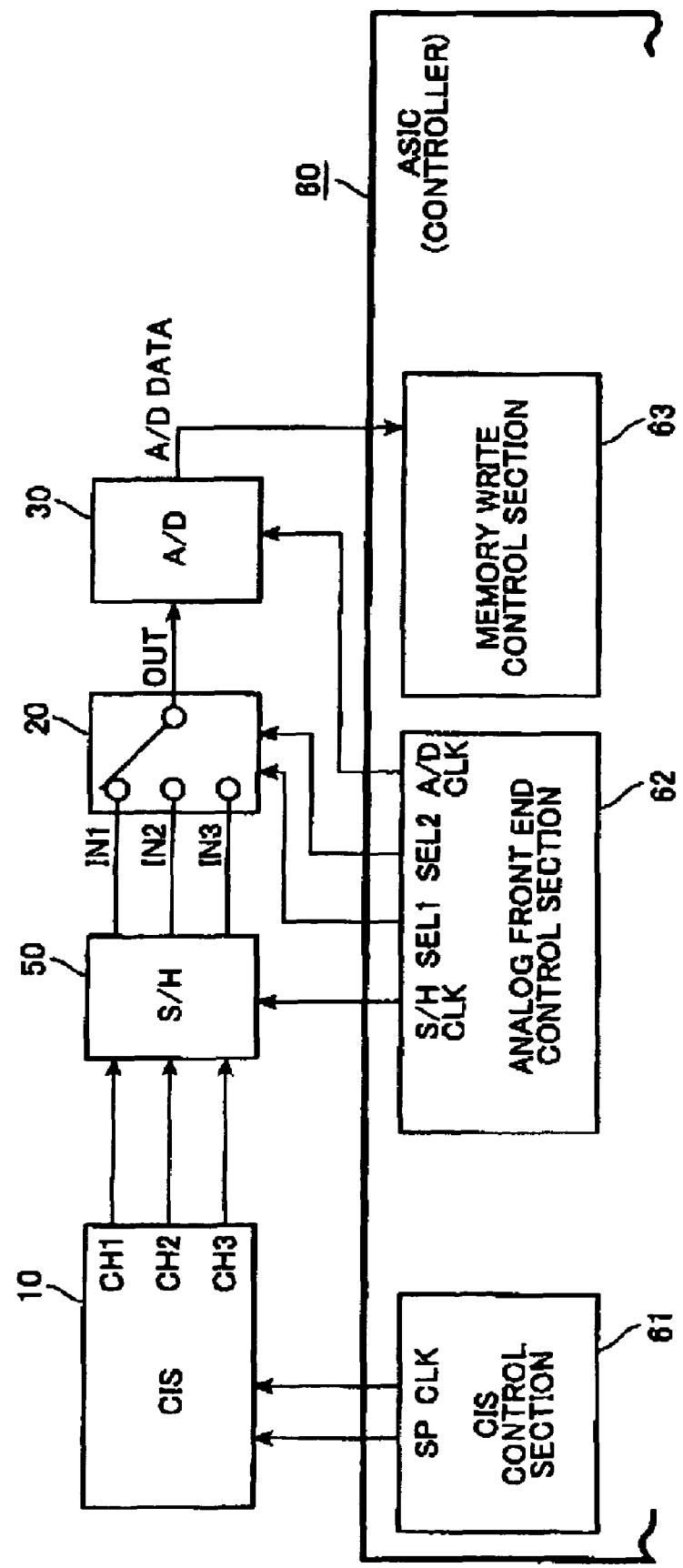
FIG. 6 is a block diagram showing an image reading apparatus according to a second embodiment.
Figure 7:
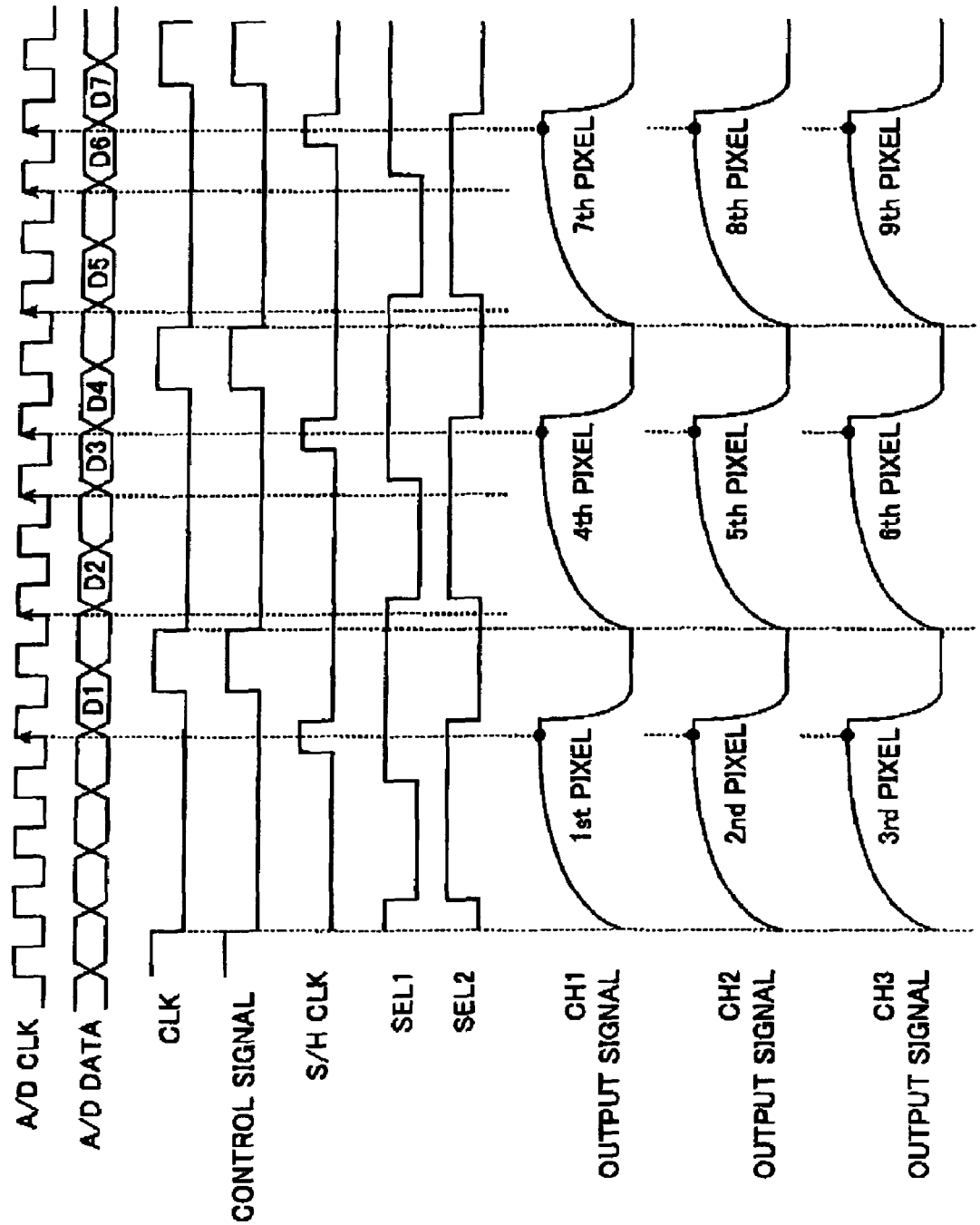
FIG. 7 is a timing chart for explaining operations of the image reading apparatus of the second embodiment.

FIGS. 6 and 7 show an image reading apparatus according to a second embodiment of the present invention. The image reading apparatus shown in FIG. 6 includes a sample-and-hold circuit 50 for storing temporarily three channel output signals CH1-CH3, in addition to the elements of the image reading apparatus shown in FIG. 1, so that a signal that is temporarily stored by the sample-and-hold circuit 50 is supplied to the multiplexer 20. Namely, three channel output signals CH1-CH3 of the image sensor 10 are not supplied directly from the photoelectric conversion elements to the multiplexer 20.

In other words, as shown in FIG. 7, even if it takes a certain time for stabilizing the three channel output signals CH1-CH3 of the image sensor 10 to be a predetermined output level, the sample-and-hold circuit 50 stores temporarily the level of three channel output signals CH1-CH3 in response to a clock signal S/H-CLK for the sample-and-holding supplied from the analog front-end control section 62 when the level of the channel output signal reaches a predetermined level and maintains the level for a certain time period. It should be noted that the clock signal S/H-CLK is issued from the analog front-end control section 62 when the channel output signal reaches the second maximum level lower than the maximum level.

When a signal for selecting the first channel output signal CH1 is supplied to the multiplexer 20 in the above-mentioned state so that the first channel output signal CH1 is selected, the first channel output signal CH1 that is temporarily stored by the sample-and-hold circuit 50 is transmitted to the analog-to-digital converter 30, and then converted from analog to digital in the analog-to-digital converter 30. In order to select the first channel output signal CH1, both SEL1 and SEL2 have a "High" level.

Next, when a signal for selecting the second channel output signal CH2 is supplied to the multiplexer 20 so that the second channel output signal CH2 is selected, the second channel output signal CH2 that is temporarily stored by the sample-and-hold circuit 50 is sent to the analog-to-digital converter 30, and then converted from analog to digital by the analog-to-digital converter 30. Concerning the signal for selecting the second channel output signal CH2, SEL1 has a "High" level while SEL2 has a "Low"s level.

Furthermore, when a signal for selecting the third channel output signal CH3 is supplied to the multiplexer 20 so that the third channel output signal CH3 is selected, the third channel output signal CH3 that is temporarily stored by the sample-and-hold circuit 50 is sent to the analog-to-digital converter 30 through the multiplexer 20, and then converted from analog to digital by the analog-to-digital converter 30. Concerning the signal for selecting the third channel output signal CH3, SEL1 has a "Low" level while SEL2 has a "High" level.

Therefore, in the second embodiment, the channel output signals CH1-CH3 may be converted from analog to digital by utilizing a period during which the clock signal S/H-CLK for the sample-and-holding is supplied, i.e., a period of clock signal CLK that is supplied to the shift register 11. Therefore, the multiplexer 20 and the analog-to-digital converter 30 are not required to operate at higher speed as the multiplexer 20 and the analog-to-digital converter 30 in the first embodiment described above.

Figure 8:
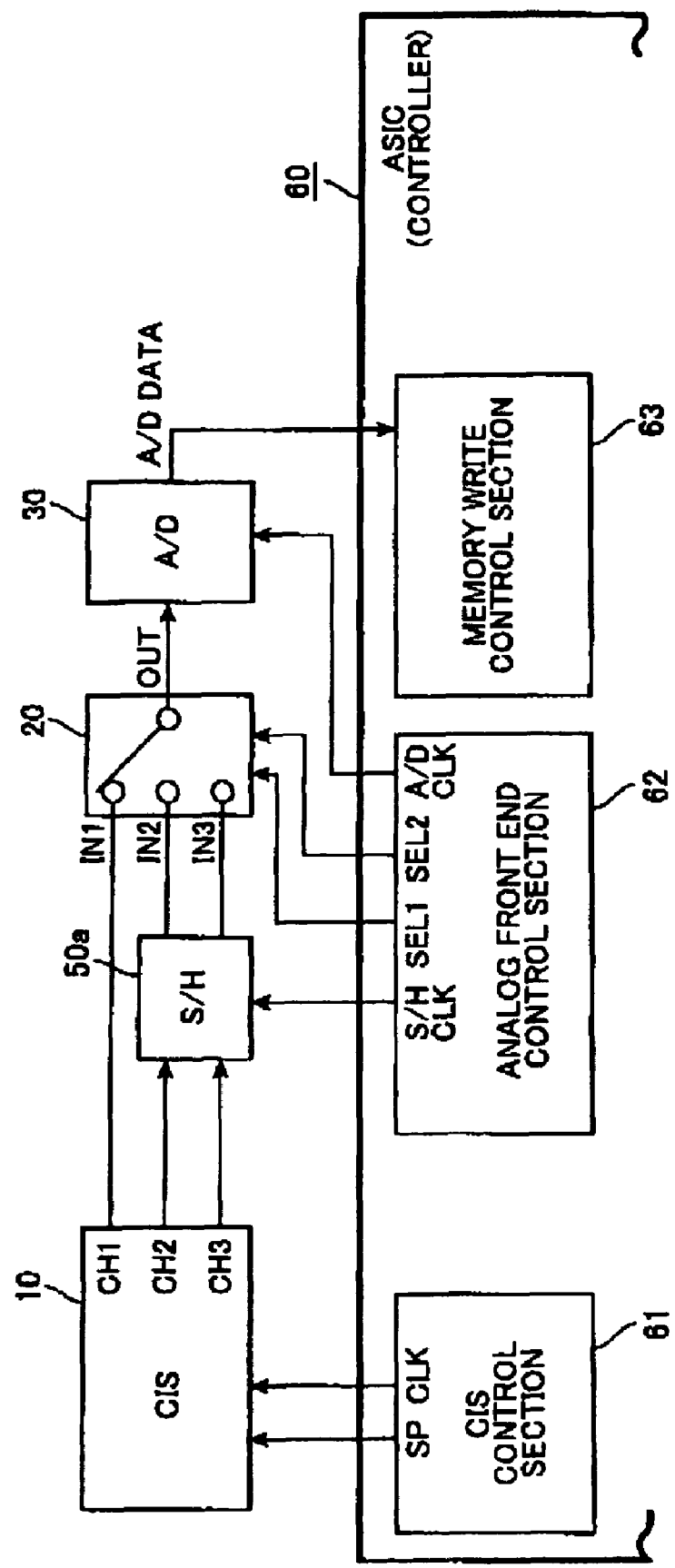
FIG. 8 is a block diagram showing an image reading apparatus of a third embodiment; is

The sample-and-hold circuit 50 in the second embodiment does not necessarily store all the three channel output signals CH1-CH3 temporarily. For example, as the third embodiment shown in FIG. 8, a sample-and-hold circuit 50a for temporarily storing the second channel output signal CH2 and the third channel output signal CH3 may be provided so that the same effect can be obtained as in the second embodiment.

Also in the second and the third embodiments, "low resolution mode" reading can be performed in the same way as in the first embodiment described above, by sending to the multiplexer 20 the selecting signals that do not involve time sequential switching, i.e., the selecting signals for fixedly connecting the first signal input terminal IN1 to the signal output terminal OUT (both the selecting signals SEL1 and SEL2 have a "Low" level). Particularly, in the third embodiment shown in FIG. 8, the function of the sample-and-hold circuit 50a can be stopped in the case where the "low resolution mode" is selected.

Figure 9:
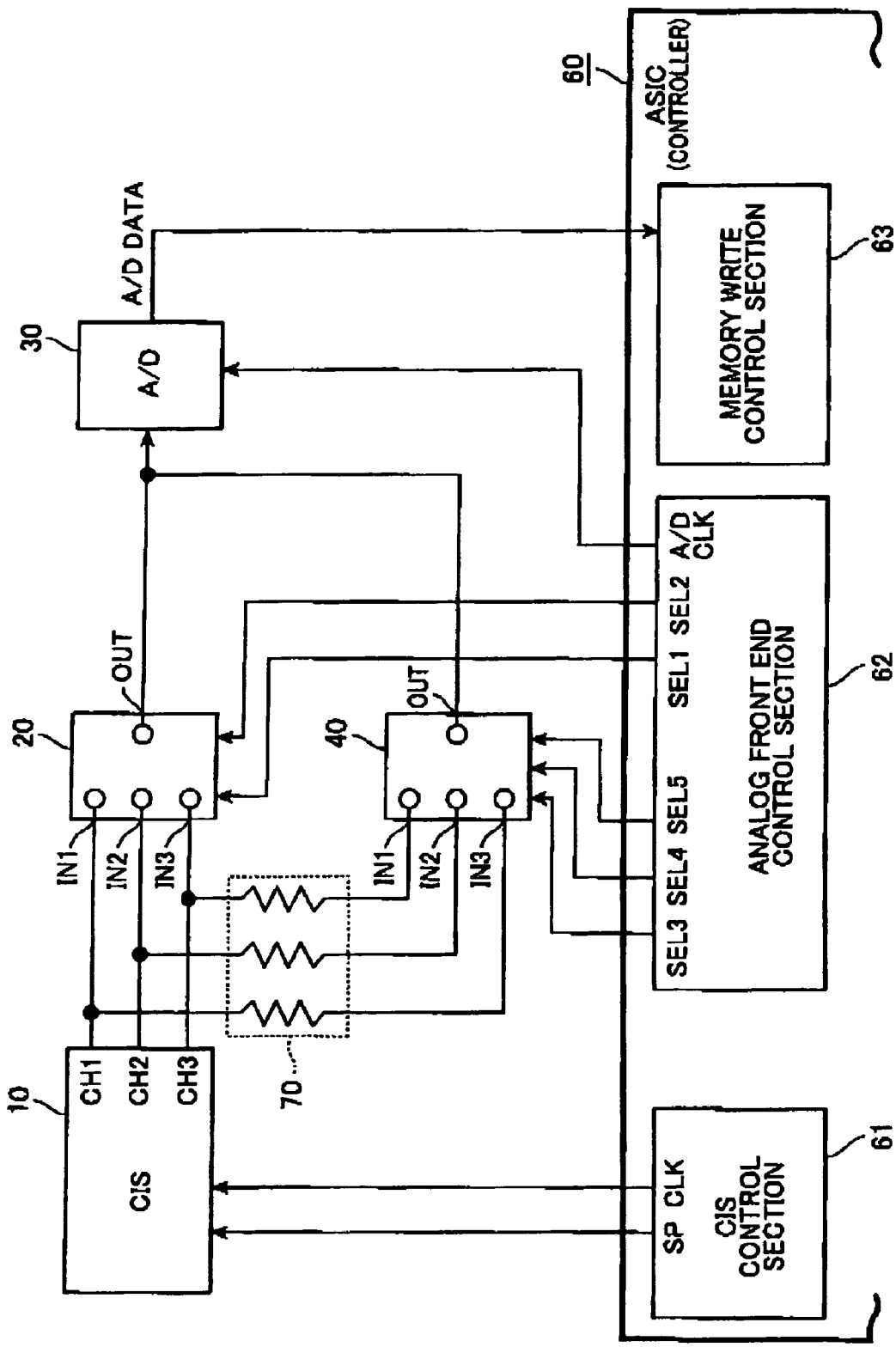
FIG. 9 is a block diagram showing an image reading apparatus of a fourth embodiment.

FIG. 9 shows an image reading apparatus of a fourth embodiment. Either one of the "low resolution mode (hereinafter referred to as a first low resolution mode)" that can be selected in the first through the third embodiments described above and a "second low resolution mode" obtained by averaging a predetermined number of pixels to obtain one pixel having the averaged signal level can be selected depending on an application.

The image reading apparatus of a fourth embodiment, a second multiplexer 40 having three inputs and one output is provided in addition to the multiplexer 20 having the same structure as the above-described first embodiment.

The second multiplexer 40 is provided for averaging the three channel output signals CH1-CH3 that are generated from the image sensor 10. The second multiplexer 40 is structured so that the channel output signals CH1-CH3 are supplied to three signal input terminals IN1-IN3 of the multiplexer 40 through resisters 70 that constitute a part of an averaging circuit. Each of the resisters 70 reduces the level of the channel output signal by a predetermined ratio for averaging the channel output signals CH1-CH3. The resistors 70 have an electrical resistance depending on the number of channel output signals to be averaged. And the averaged signal generated in the multiplexer 20 is supplied to the analog-to-digital converter 30.

Namely, the second multiplexer 40 can have five states as follows in response to three selecting signals SEL3-SEL5 that are supplied through the analog front-end control section 62. One is a first selection state where none of the three signal input terminals IN1-IN3 is connected to the output terminal OUT. Another is a second selection state where all the three signal input terminals IN1-IN3 are connected to the output terminal OUT. In third through fifth selection states, any two of three signal input terminals IN1-IN3 (the first and the second signal input terminals IN1 and IN2, or the first and the third signal input terminals IN1 and IN3, or the second and the third signal input terminals IN2 and IN3) are connected to the output terminal OUT, respectively. Especially in the second selection state, the second multiplexer 40 operates as an averaging circuit that cooperates with the resisters 70 for averaging the three channel output signals CH1-CH3 and supplying the averaged signal to the analog-to-digital converter 30.

Furthermore, the second multiplexer 40 is structured in the same way as the multiplexer 20 and includes a plurality of analog switches. However, it should be noted that the second multiplexer 40 is structured not to perform the inherent operation of the multiplexer, i.e., turning on the plural analog switches sequentially.

In the fourth embodiment, if the "high resolution mode" or the "first low resolution mode" is selected by an external apparatus, an operation panel, the second multiplexer 40 is first switched to the first selection state (the state where none of the three signal input terminals IN1-IN3 is connected to the output terminal OUT), and then the three signal input terminals IN1-IN3 of the multiplexer 20 are switched time-sequentially in the same way as in the first embodiment described above. Thus, the multiplexer 20 can supply the three channel output signals CH1-CH3 sequentially to the analog-to-digital converter 30, so that high resolution reading can be performed. In addition, when the first signal input terminal IN1 of the multiplexer 20 is fixedly connected to the output terminal OUT, only the first channel output signal CH1 is supplied to the analog-to-digital converter 30, so that the low resolution reading with so-called thinning-out can be performed by using only one out of every three image signals.

Figure 10:
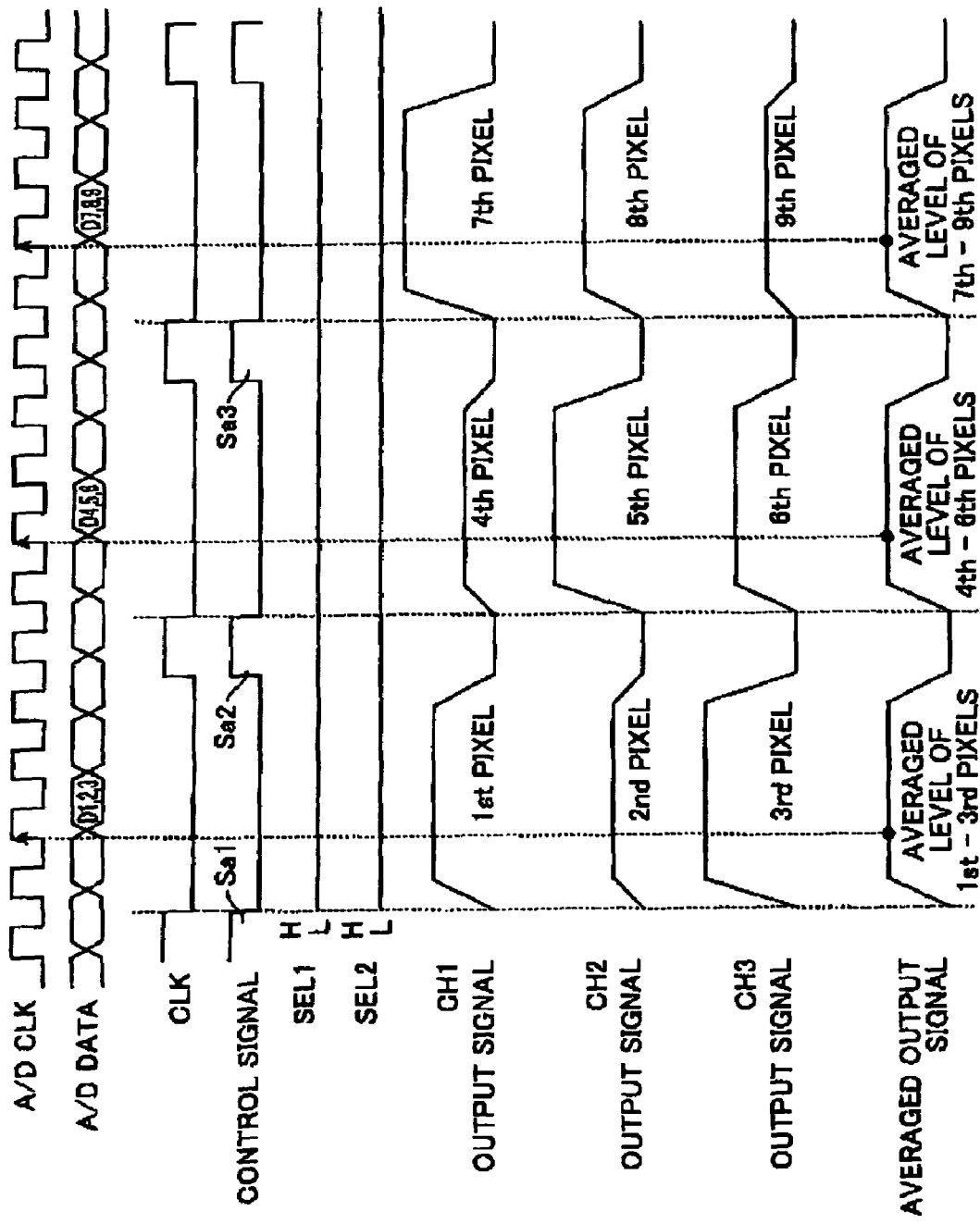
FIG. 10 is a timing chart for explaining operations of the image reading apparatus of the fourth embodiment.

In addition, while the multiplexer 20 is maintained in the state where none of the three signal input terminals IN1-IN3 is connected to the output terminal OUT in accordance with the selecting signals SEL1 and SEL2 that are supplied from the analog front-end control section 62 (the state where both SEL1 and SEL2 have a "L" level), the second multiplexer 40 can be switched to the second selection state (the state where all the three signal input terminals IN1-IN3 are connected to the output terminal OUT). In this case, the second multiplexer 40 can supply the averaged signal of the three channel output signals CH1-CH3 to the analog-to-digital converter 30. Therefore, as shown in FIG. 10, for example, at the time point when the control signal Sa1 is issued from the shift register 11, the averaged signal of the read signals from the phototransistors P1-P3 (the first through the third pixel signals) is generated as the digital signal corresponding to the first group. At the time point when the control signal Sa2 is issued, the averaged signal of the read signals from the phototransistors P4-P6 (the fourth through sixth pixel signals) is generated as the digital signal corresponding to the second group. In the same way, every time the output destination of the control signal Sa is sequentially shifted among the groups of the phototransistors P, the averaged signal of th seventh through ninth, tenth through twelfth, . . . , or 1726-th through 1728-th pixel signals is generated as the digital signal corresponding to each of the groups.

Thus, also in the "second low resolution mode", in the same way as in the "first low resolution mode", the number of the signals that are generated as the read image signals can be reduced to ⅓. Accordingly, if the reading resolution in the "high resolution mode" is "600 dpi" for example, reading is performed at the resolution of "200 dpi".

In addition, also in the "second low resolution mode", analog-to-digital conversion operation may be performed once every time the output destination of the control signal Sa is shifted among the groups of phototransistors P. Therefore, compared with the "high resolution mode" that requires three analog-to-digital conversion operations for one control signal Sa, the frequency of the clock signal CLK can be increased so that high speed reading can be performed.

Accordingly, reading in the low resolution mode is advantageous for the case where high speed reading is required while ensuring to maintain continuity of thin lines.

Furthermore, the second multiplexer 40 can switch among the third through the fifth selection states, so as to average any two channel signals among the three channel output signals CH1-CH3 and to supply the averaged signal to the analog-to-digital converter 30. Therefore, various image signals can be generated as the read image signal in the "low resolution mode".

Figure 11:
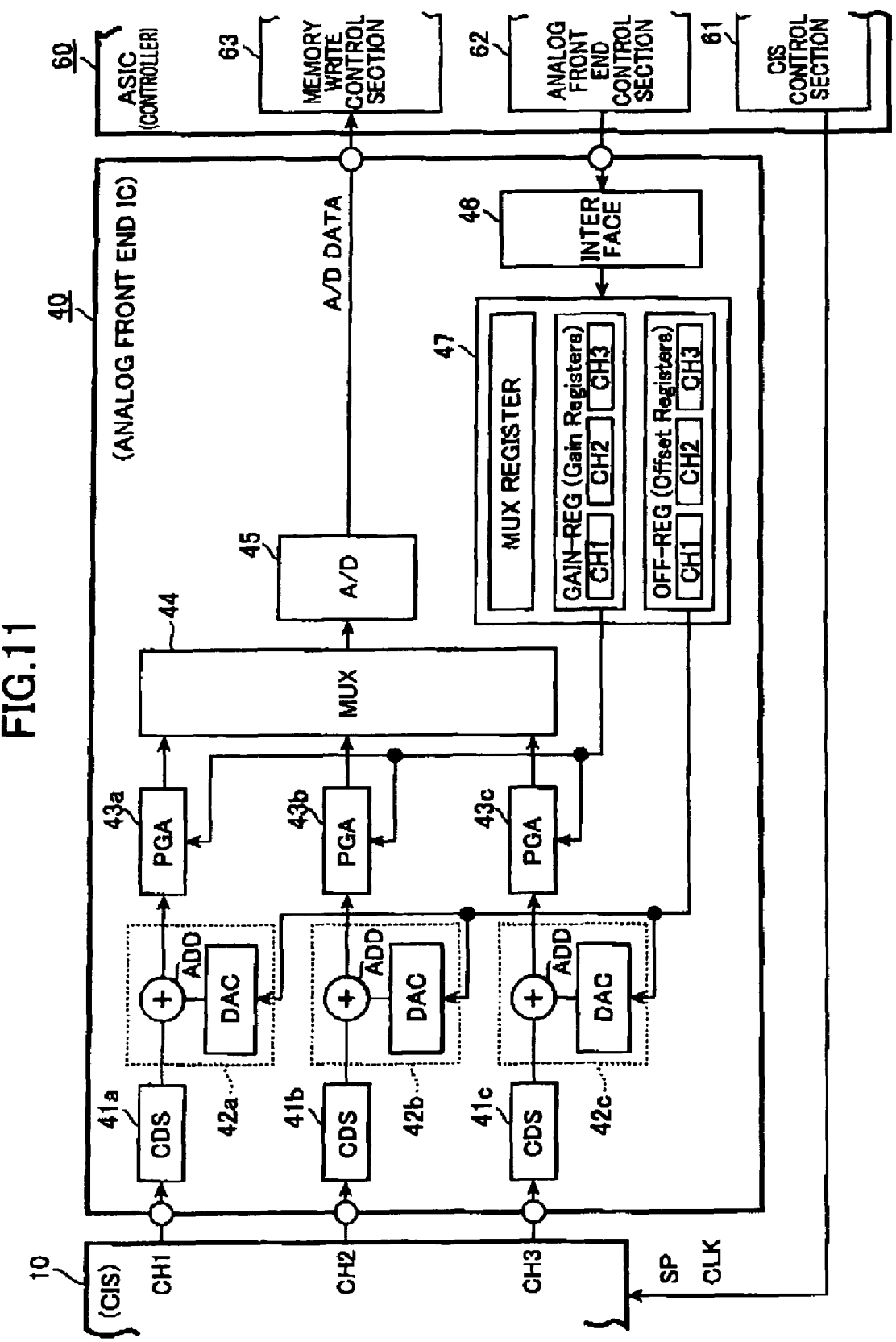
FIG. 11 is a block diagram showing an image reading apparatus of a fifth embodiment.

FIG. 11 shows an image reading apparatus of a fifth embodiment according to the present invention. This image reading apparatus includes an IC having all analog and hybrid signal functions necessary for digitizing outputs of various types of MOS image sensors or CCD image sensors such as a correlation double sampling (CDS) function, a gain/offset correction function, and an analog-to-digital conversion function. Namely, this image reading apparatus is produced with an analog front-end IC (integrated circuit) for an image sensor processing system.

The analog front-end IC 40 shown in FIG. 11 has the same structure as a commercial analog front-end IC. Namely, the analog front-end IC 40 includes correlation double sampling circuits 41a-41c, offset adjustment circuits 42a-42c, programmable gain amplifiers 43a-43c, a multiplexer 44, an analog-to-digital converter 45, an interface 46 and a register portion 47.

In general, this type of analog front-end IC 40 includes three channels so as to support a color image sensor that generates red, green and blue output signals. Therefore, the analog front-end IC 40 includes the correlation double sampling circuits 41a-41c described above, the offset adjustment circuits 42a-42c and the programmable gain amplifiers 43a-43c for each channel.

The correlation double sampling circuits 41a-41c are provided for eliminating components which may cause noises and errors from pixel signals supplied from the CCD type image sensor. The correlation double sampling circuits 41a-41c, as known well, performs sampling of pixel signals received from the CCD type image sensor twice at two different timings to eliminate error voltage that may be caused by electric charges when the clock of the shift register (CCD) changes from the "L" level to the "H" level. However, when used with the MOS type image sensor 10 of the present invention, the correlation double sampling circuits 41a-41c are set not to have the correlation double sampling function thereof (CDS off mode setting). In this embodiment, the correlation double sampling circuits 41a-41c operate as sample-and-hold circuits for storing the pixel signals received from the MOS type image sensor 10 temporarily for each channel.

Each of the offset adjustment circuits 42a-42c includes a digital-to-analog converter DAC and an adder ADD for each channel, so that an offset voltage is added to an input signal of each channel. Namely, the register portion 47 is provided with an offset register OFF-REG, which memorizes a set value of the offset indicating offset voltage that is applied by the offset adjustment circuits 42a-42c for each channel. Each of the offset adjustment circuits 42a-42c for each channel adds first the offset voltage corresponding to the set value of the offset thereof that is memorized in the offset register OFF-REG to the image signal that is transmitted from the correlation double sampling circuits 41a-41c. Next, each of the offset adjustment circuits 42a-42c supplies the image signal, to which the offset voltage is added, to the corresponding channel of the programmable gain amplifiers 43a-43c.

The programmable gain amplifiers 43a-43c are well-known analog amplifiers that can adjust a gain to the input signal. Each of the programmable gain amplifiers 43a-43c amplifies the image signal of the corresponding channel by a gain corresponding to the gain set value for each channel that is memorized in a gain register GAIN-REG of the register portion 47. The amplified image signal is then supplied to the multiplexer 44.

The multiplexer 44 and the analog-to-digital converter 45 operate in the same way as the multiplexer 20 and the analog-to-digital converter 30 in the first through the third embodiments described above. The multiplexer 44 selects one of the input image signals from the three programmable gain amplifiers 43a-43c to output the selected signal. The multiplexer 44 supplies the image signal that is amplified by each of the programmable gain amplifiers 43a-43c sequentially to the analog-to-digital converter 45. The analog-to-digital converter 45 converts the image signal received from the multiplexer 44 into a digital signal having a predetermined bit number of digital code and then sends the digital signal to outside.

The interface 46 is provided for writing many types of data into the register portion 47 through the analog front-end control section 62 of the control circuit 60. The interface 46 writes an optimal set value of the offset and an optimal gain set value that are obtained by a calibration operation in pre-scanning before real scanning into a memory portion of the register portion 47 corresponding to each channel.

In the apparatus having the above described structure according to the fifth embodiment, a general-purpose analog front-end IC can be used for converting the three channel read image signals, that are transmitted from the signal output lines of the image sensor 10, into a digital signal for each pixel signal. Therefore, compared with the first through the third embodiments described above, a circuit structure diagram can be simplified substantially.

In addition, it is possible to utilize the offset adjustment function or the gain adjustment function of the analog front-end IC to correct variation among plural channels easily and appropriately. Furthermore, since a special circuit for the sample-and-holding is not necessary, wiring for the circuit connection is not required, thereby reducing external noises.

Figure 12:
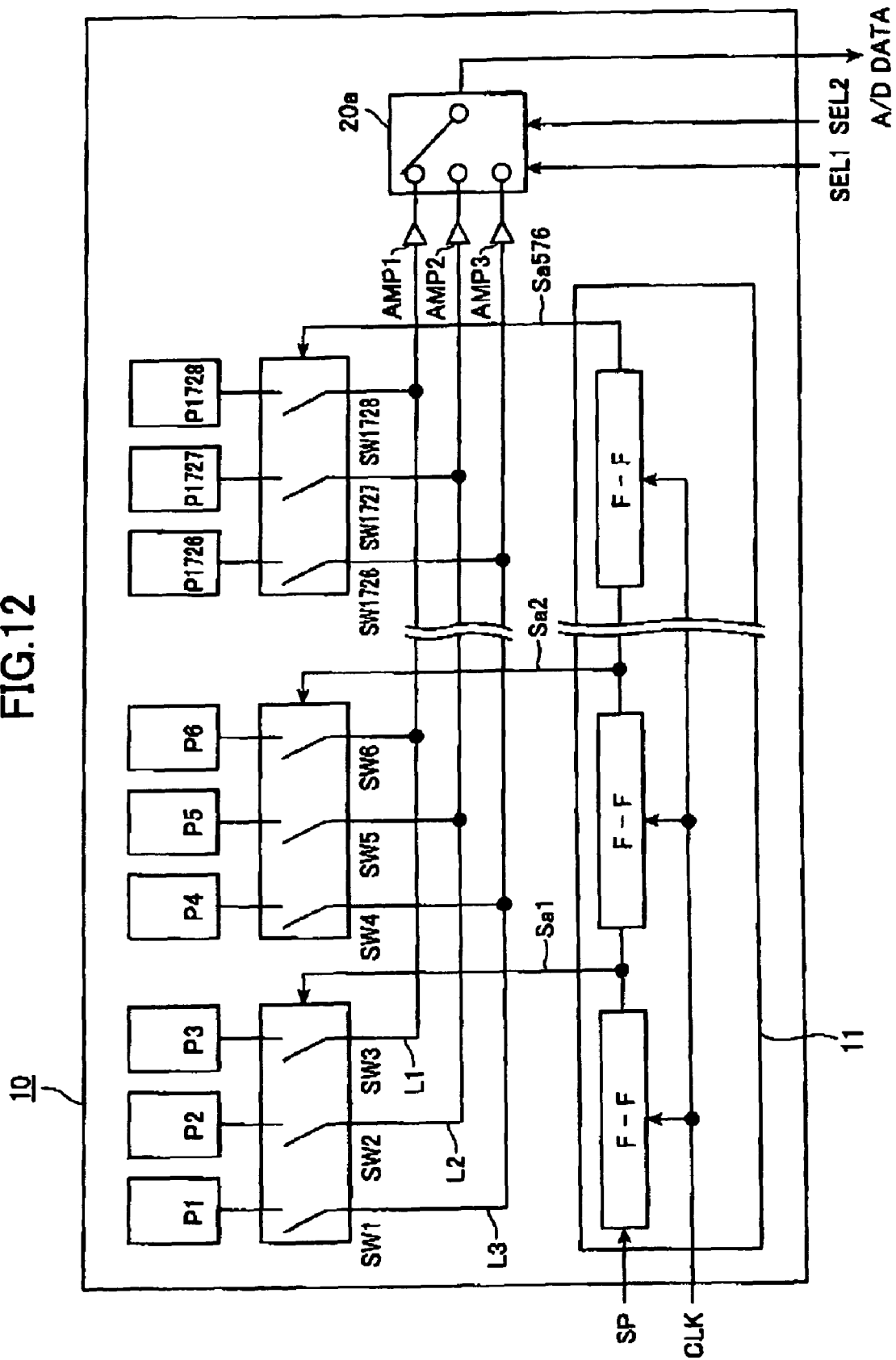
FIG. 12 is a circuit diagram showing an image sensor of a sixth embodiment.

The structure in the above embodiment is not limited to the illustrated one. The image reading apparatus of present invention may have a structure shown in FIG. 12 as a sixth embodiment. The image sensor 10 includes a multiplexer circuit 20a having the same function as the multiplexer 20 described above. In addition, the image reading apparatus may include a sample-and-hold circuit (not illustrated) having the same function as the sample-and-hold circuits 50 and 50a.

Figure 13:
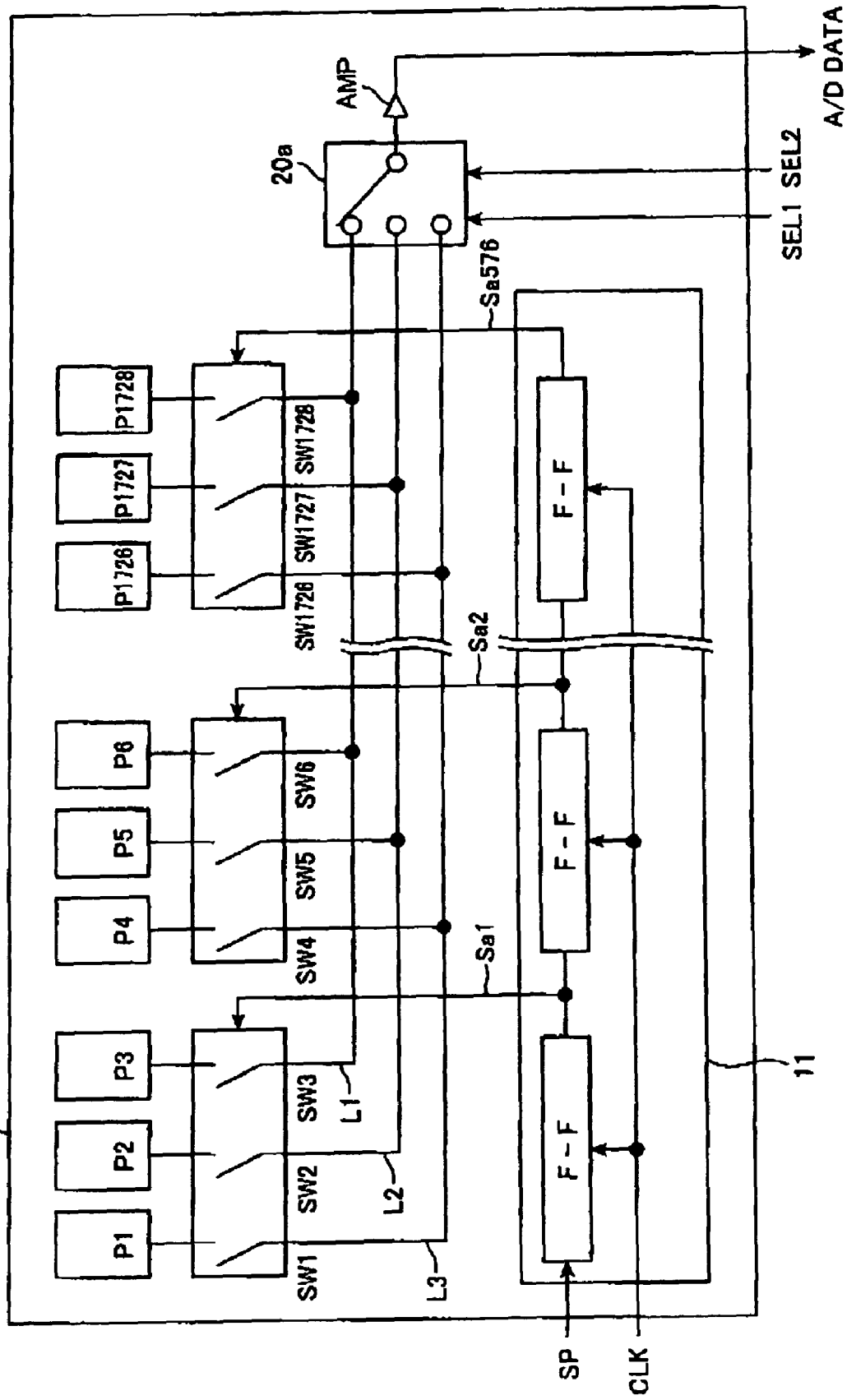
FIG. 13 is a circuit diagram showing an image sensor of a seventh embodiment.

If the image sensor 10 includes the multiplexer circuit 20a, an analog amplifier AMP may be provided subsequent to the multiplexer circuit 20a as shown in FIG. 13 as a seventh embodiment. This image reading apparatus may be advantageous in terms of cost.

Figure 14:
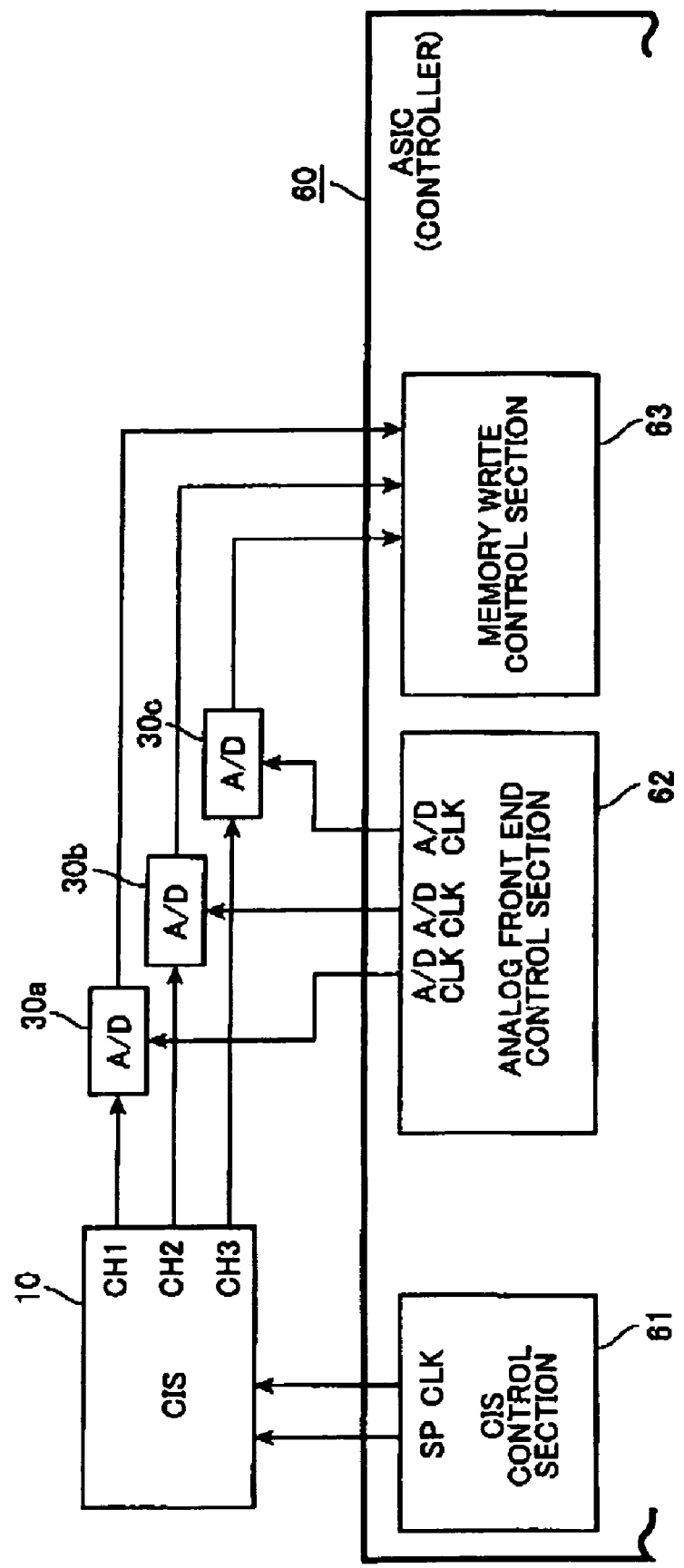
FIG. 14 is a block diagram showing an image sensor of an eighth embodiment.

Furthermore, in the above-described embodiment, three channel signal outputs are multiplexed by the multiplexer 20 so as to be converted into a digital signal by a single analog-to-digital converter 30. However, as shown in FIG. 14 as an eighth embodiment, it is possible to provide three analog-to-digital converters 30a-30c for each channel corresponding to three channel output signals CH1-CH3.

In this structure, even if high speed reading operation is required, a very high speed analog-to-digital converter 30 is not needed. In addition, it is also advantageous that a multiplexer 20 that can operate at a high speed is not necessary.

Figure 15:
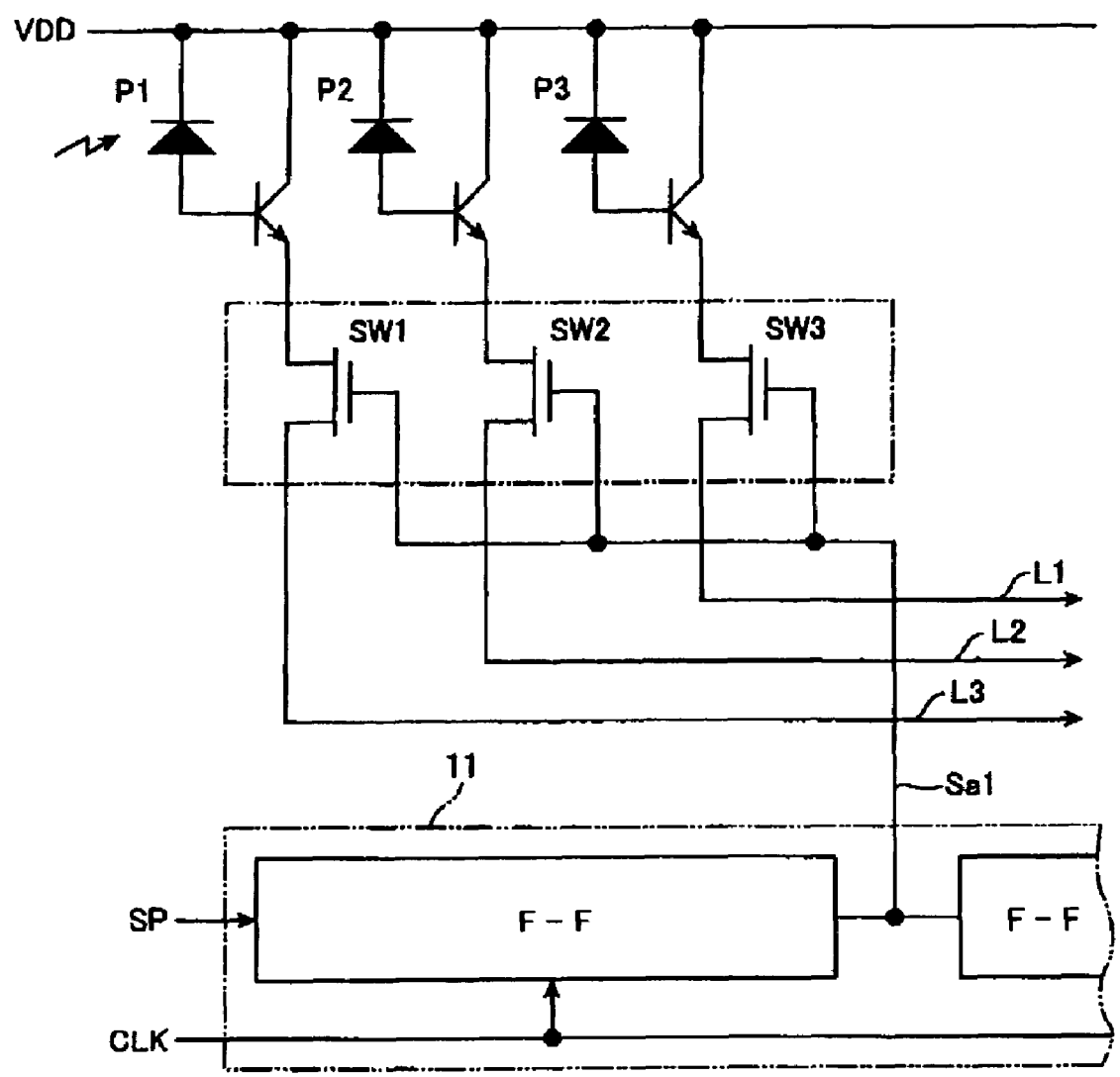
FIG. 15 is a circuit diagram showing a part of an image sensor of another embodiment.

Though some embodiments that concretely describe the present invention are described above, an image sensor and an image reading apparatus using the image sensor according to the present invention are not limited to the above-described embodiments but can be embodied in different manners. For example, the photoelectric conversion element of the image sensor 10 is not limited to the phototransistor shown in FIG. 2, but can be a photodiode as an image sensor shown in FIG. 15. Furthermore, any appropriate type of photoelectric conversion element may be used.

In addition, if the image sensor 10 is a contact type image sensor (CIS), an image sensor that is very long in the main scanning direction is necessary, as the width of a document to be read becomes large in the main scanning direction. However, there is a limit to manufacture a large image sensor on a single semiconductor chip.

Figure 16:
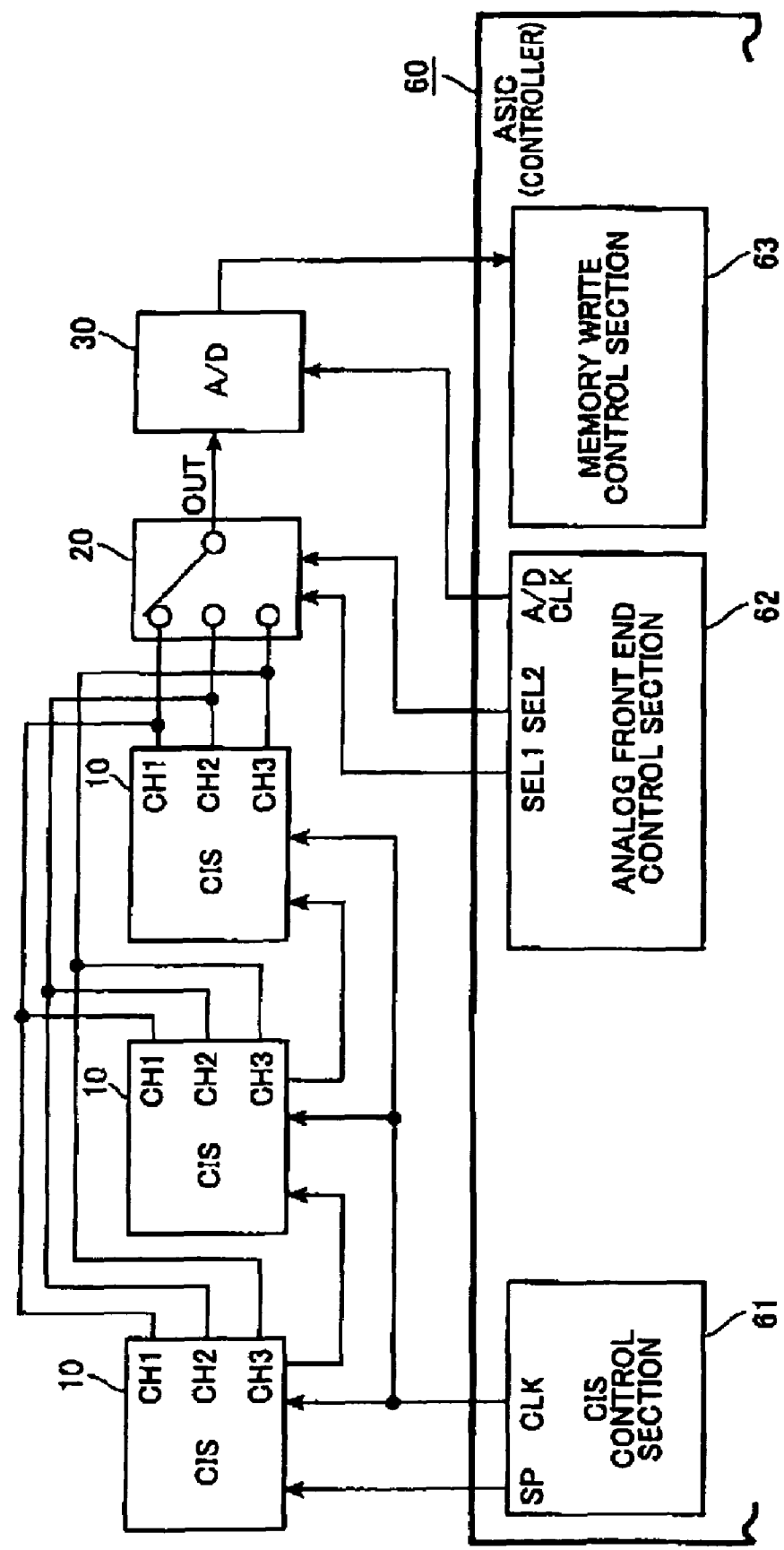
FIG. 16 is a diagram showing an image reading apparatus of another embodiment.
Figure 17:
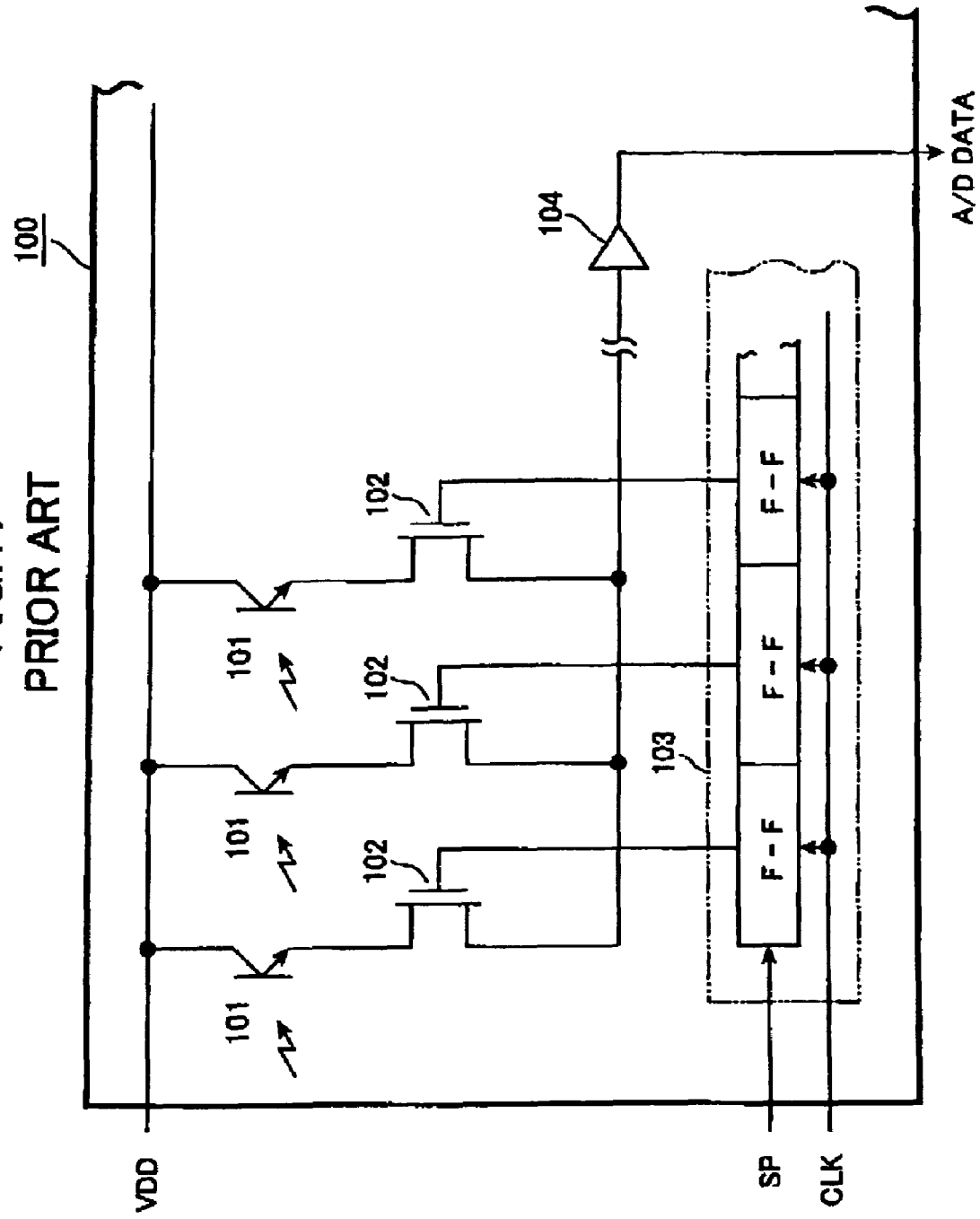
FIG. 17 is a circuit diagram showing a conventional image sensor.

In order to solve the above problem, a plurality of image sensors 10 may be aligned along the main scanning direction as an image sensor shown in FIG. 16. In operation thereof, an output of the final flip-flop circuit of the shift register 11 constituting each of the image sensors 10 may be supplied to the neighboring image sensor 10 as a start pulse SP.

An image sensor according to the present invention includes a plurality of photoelectric conversion elements that are divided into plural groups each including a predetermined number (N) of neighboring photoelectric conversion elements, a plurality of switching elements, and a control unit for controlling the plural switching elements so as to read image signals from the plural photoelectric conversion elements belonging to each of the groups simultaneously for each group in accordance with an external clock signal. According to this structure, the frequency of the clock signal can be decreased to 1/N compared with the conventional image sensor. Thus, switching elements that are capable of high speed switching are not required. In addition, since the number of flip-flop circuits of the shift register included in the control unit can be also reduced to 1/N, a dimension of the entire sensor can be reduced. In addition, since high speed reading can be performed by a low speed clock signal, generation of EMI noise can be suppressed.

According to the image sensor of the present invention, the read image signals from the plural photoelectric conversion elements are sent to the corresponding signal output line inside the image sensor. The number of the signal output lines is the same as the number (N) of the photoelectric conversion elements belonging to one of the groups. Therefore, the number of terminals for outputting signals from the image sensor can be minimized so that electric connection to a subsequent multiplexer or a subsequent analog-to-digital converter can be simplified.

According to the image sensor of the present invention, an analog amplifier for amplifying the image signal is provided to each of the signal output lines in the image sensor. Therefore, a read image signal from each photoelectric conversion element can be extracted from the image sensor as an analog signal having a sufficient level.

According to the image sensor of the present invention, the image signals from the photoelectric conversion elements are multiplexed, so that image signals from plural (N) photoelectric conversion elements are extracted from the image sensor as a serial data. Therefore, the number of terminals for outputting signals from the image sensor can be minimized, so that electric connection to a subsequent analog-to-digital converter can be simplified.

According to the image sensor of the present invention, the image signals from the photoelectric conversion elements are multiplexed, so that image signals generated from plural (N) photoelectric conversion elements are extracted from the image sensor as a serial data in the image sensor. Therefore, the number of terminals for outputting signals from the image sensor can be minimized, so that electric connection to a subsequent analog-to-digital converter can be simplified.

According to the image sensor of the present invention, the read image signals from the photoelectric conversion elements are stored temporarily by a sample-and-hold circuit, and then are multiplexed by a multiplexer. After that, the image signals extracted from the image sensor as a serial data. Accordingly, when the read signal from each photoelectric conversion element is converted into a digital signal by the analog-to-digital converter, a time necessary for the conversion process can be sufficiently provided. Therefore, an analog-to-digital converter operating at a high speed is not necessary.

According to an image reading apparatus of the present invention, a multiplexer for multiplexing image signals supplied from the signal output lines of the image sensor, an analog-to-digital converter for converting the image signal that is multiplexed by the multiplexer into a digital signal for each of the image signals supplied from the photoelectric conversion elements are provided outside the image sensor. Therefore, a plurality of image signals supplied from the photoelectric conversion elements can be converted into digital signals by a single analog-to-digital converter.

According to the image reading apparatus of the present invention, each of the plural image signals supplied from the signal output lines of the image sensor can be converted into a digital signal independently by each of the plural analog-to-digital converters. Therefore, even if the analog-to-digital converter operates at relatively low speed, it is possible to perform high speed reading operation.

According to the image reading apparatus of the present invention, the plural read image signals that are supplied from the signal output lines are stored temporarily by the sample-and-hold circuit, multiplexed by the multiplexer and extracted from the image sensor as a serial data. Therefore, when the read signal from the photoelectric conversion elements are converted into digital signals by the analog-to-digital converter, a time period required for the converting operation can be secured. Accordingly, an analog-to-digital converter operating at a high speed is not required.

According to an image reading apparatus of the present invention, the plural read image signals supplied from the signal output lines of the image sensor can be converted into digital signals for each pixel signal by using the analog front-end IC, so that a structure of circuits can be simplified substantially.

In addition, resolution switching units performs time sequential switching of the image signals from the plural photoelectric conversion elements by using the multiplexer. Thus, not only high resolution reading but also low resolution reading can be performed by supplying only a part of the image signals to the analog-to-digital converter.

According to an image reading apparatus of the present invention, only the image signal from one of the plural signal input terminals of the multiplexer is supplied to the analog-to-digital converter, so that low resolution read image signal can be obtained easily and at high speed.

According to an image reading apparatus of the present invention, some of the plural signal input terminals of the multiplexer is switched time-sequentially, so that the image signals selected from plural signal input terminals are supplied to the analog-to-digital converter. Therefore, low resolution that corresponds to, for example, 2/3 resolution of that in high resolution mode can be obtained easily.

According to an image reading apparatus of the present invention, some image signals selected among plural photoelectric conversion elements belonging to one of the groups can be averaged and supplied to the analog-to-digital converter. Therefore, low resolution reading can be performed easily by averaging the plural image signals, if necessary, in addition to low resolution reading by so-called simple thinning-out utilizing only the image signals at a constant pitch.

According to an image reading apparatus of the present invention, a signal that is an average of all signals from the photoelectric conversion elements of each group is supplied to the analog-to-digital converter, using all the image signals effectively. Therefore, it is very useful if high speed reading is desired while securing to keep a fine line.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An image reading apparatus comprising:
   an image sensor that includes:
      a plurality of photoelectric conversion elements arranged in a main scanning direction, each of the plurality of photoelectric conversion elements generating an analog image signal corresponding to an amount of incident light thereon, the plurality of photoelectric conversion elements being divided into plural groups, each of the plural groups including a predetermined number (N) of the photoelectric conversion elements;
      a plurality of switching elements connected to respective ones of the plurality of photoelectric conversion elements, individually;
      a control unit that controls the plurality of switching elements in response to an external clock signal to simultaneously output the image signals from the predetermined number of photoelectric conversion elements in one of the plural groups; and
      signal output lines with a number of N, wherein the predetermined number of photoelectric conversion elements in each of the plural groups are connectable with the respective ones of the signal output lines through the switching elements, individually, to output the image signals from the predetermined number of photoelectric conversion elements to the signal output lines;
   a multiplexer connected to the image sensor for multiplexing the image signal transferred from one of the photoelectric conversion elements through the corresponding one of the signal output lines; and
   a sample-and-hold circuit connected to the image sensor for temporarily storing the image signals transferred from the photoelectric conversion elements in one group though the corresponding ones of the switching elements and the signal output lines; wherein the multiplexer is configured to connect with the image sensor so that one signal output line connects the image sensor to the multiplexer directly and the other signal output lines connect the image sensor to the multiplexer through the sample-and-hold circuit.

2. The image reading apparatus according to claim 1, further comprising an analog-to-digital converter for converting the image signal that is multiplexed by the multiplexer into a digital signal.

3. The image reading apparatus according to claim 1, wherein the multiplexer first receives the image signal transferred from one of the plural groups through the one signal output line among the image signals transferred from one of the plural groups.

4. The image reading apparatus according to claim 2, further comprising:
   a resolution switching unit that selects one of a high resolution mode in which all the image signals from the photoelectric conversion elements that belong to each of the groups are supplied sequentially to the analog-to-digital converter, and a low resolution mode in which the image signals are thinned out and then supplied to the analog-to-digital converter, wherein
   the multiplexer receives only the image signal transferred through the one signal output line when the low resolution mode is selected.

5. The image reading apparatus according to claim 1, wherein the predetermined number (N) is at least 3.

6. An image reading apparatus comprising:
   an image sensor that includes:
      a plurality of photoelectric conversion elements arranged in a main scanning direction, each of the plurality of photoelectric conversion elements generating an analog image signal corresponding to an amount of incident light thereon, the plurality of photoelectric conversion elements being divided into plural groups, each of the plural groups including a predetermined number (N) of the photoelectric conversion elements;
      a plurality of switching elements connected to respective ones of the plurality of photoelectric conversion elements, individually; and
      a control unit that controls the plurality of switching elements in response to an external clock signal to simultaneously output the image signals from the predetermined number of photoelectric conversion elements in one of the plural groups, wherein the predetermined number of photoelectric conversion elements in each of the plural groups are connectable with the respective ones of the signal output lines through the switching elements, individually, to output the image signals from the predetermined number of photoelectric conversion elements to the signal output lines;
   a multiplexer having signal input terminals with a number equal to N and a signal output terminal, the multiplexer being connected to the image sensor so that the multiplexer receives the image signals from the plural photoelectric conversion elements that belong to one of the groups through the signal input terminals simultaneously;
   an analog-to-digital converter connected to the signal output terminal of the multiplexer for converting the analog image signal supplied sequentially from the multiplexer into a digital signal; and
   resolution switching unit that select one of a high resolution mode in which all the image signals from the photoelectric conversion elements that belong to each of the groups are supplied sequentially to the analog-to-digital converter and a low resolution mode in which the image signals are thinned out and then supplied to the analog-to-digital converter.

7. The image reading apparatus according to claim 6, wherein the resolution switching unit is configured to supply the image signals received from only one of the signal input terminals to the analog-to-digital converter, when the low resolution mode is selected.

8. The image reading apparatus according to claim 6, wherein the resolution switching unit is configured to select the signal input terminals among all the signal input terminals to supply the image signal from the selected signal input terminals to the analog-to-digital converter by switching the selected signal input terminals time-sequentially when the low resolution mode is selected.

9. The image reading apparatus according to claim 6, further comprising an averaging circuit for averaging the image signals selected among the image signals received from the plural photoelectric conversion elements that belong to one of the groups, wherein the resolution switching unit selects another low resolution mode in which the averaging circuit is used to lower the resolution of the image in addition to the high and low resolution modes, wherein an output signal of the averaging circuit is supplied to the analog-to-digital converter when the another low resolution mode is selected.

10. The image reading apparatus according to claim 9, wherein the averaging circuit is configured to average all the signals received from the photoelectric conversion elements that belong to one of the groups and to supply the averaged signal to the analog-to-digital converter.

* * * * *